(12) United States Patent
Mori et al.

(10) Patent No.: US 12,165,456 B2
(45) Date of Patent: Dec. 10, 2024

(54) INFORMATION PROCESSING APPARATUS, INFORMATION PROCESSING METHOD, AND STORAGE MEDIUM

(71) Applicant: NEC Corporation, Tokyo (JP)

(72) Inventors: Yusuke Mori, Tokyo (JP); Akira Kamei, Tokyo (JP); Miki Otani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 76 days.

(21) Appl. No.: 18/012,848

(22) PCT Filed: Jun. 30, 2020

(86) PCT No.: PCT/JP2020/025713
§ 371 (c)(1),
(2) Date: Dec. 23, 2022

(87) PCT Pub. No.: WO2022/003839
PCT Pub. Date: Jan. 6, 2022

(65) Prior Publication Data
US 2023/0334927 A1    Oct. 19, 2023

(51) Int. Cl.
*G07C 9/37* (2020.01)
*G01C 21/20* (2006.01)
(Continued)

(52) U.S. Cl.
CPC ............. *G07C 9/37* (2020.01); *G01C 21/206* (2013.01); *G06K 7/10366* (2013.01);
(Continued)

(58) Field of Classification Search
None
See application file for complete search history.

(56) References Cited

U.S. PATENT DOCUMENTS 6,698,653 B1 * 3/2004 Diamond ............... G07C 9/257
235/382
7,193,515 B1 * 3/2007 Roberts ................... B64F 1/368
340/568.1
(Continued)

FOREIGN PATENT DOCUMENTS

JP    2004-054776 A    2/2004
JP    2007-079656 A    3/2007
(Continued)

OTHER PUBLICATIONS

JP Office Office Communication for JP Application No. 2022-036864, mailed on May 18, 2023 with English Translation.
(Continued)

*Primary Examiner* — K. Wong
(74) *Attorney, Agent, or Firm* — Sughrue Mion, PLLC

(57) ABSTRACT

An information processing apparatus according to the present invention includes: a biometric information acquisition unit that acquires biometric information of a user at an arrival airport; a biometric matching unit that performs a matching process of the biometric information with registered biometric information of a registrant who deposited a baggage with the airline at a departure airport; and a guide unit that outputs guide information including a location of pickup in the arrival airport and a start time of pickup of the baggage associated with the registered biometric information to the user who is authenticated as the same person as the registrant by the matching process.

17 Claims, 30 Drawing Sheets

(51) Int. Cl.
*G06K 7/10* (2006.01)
*G06V 10/74* (2022.01)
*G06V 40/16* (2022.01)
*G06V 40/70* (2022.01)
*G07C 9/00* (2020.01)

(52) U.S. Cl.
CPC ............ *G06V 10/74* (2022.01); *G06V 40/172* (2022.01); *G06V 40/70* (2022.01); *G07C 9/00563* (2013.01)

(56) References Cited

U.S. PATENT DOCUMENTS

| | | | | |
|---|---|---|---|---|
| 2003/0100973 | A1* | 5/2003 | Quackenbush | G06Q 10/02 700/226 |
| 2004/0124982 | A1* | 7/2004 | Kovach | G08B 13/2417 340/572.1 |
| 2005/0258230 | A1* | 11/2005 | Wiater | G06Q 10/08 340/5.1 |
| 2007/0115123 | A1 | 5/2007 | Roberts et al. | |
| 2007/0203765 | A1* | 8/2007 | Schoen | G06Q 20/102 705/5 |
| 2010/0076796 | A1 | 3/2010 | Klein et al. | |
| 2012/0056723 | A1* | 3/2012 | Zhu | G06Q 10/08 340/10.1 |
| 2015/0197348 | A1 | 7/2015 | Song et al. | |
| 2018/0211187 | A1 | 7/2018 | Chen et al. | |
| 2020/0042812 | A1* | 2/2020 | Sakaguchi | G06Q 10/0635 |
| 2021/0342966 | A1 | 11/2021 | Watanabe et al. | |

FOREIGN PATENT DOCUMENTS

| | | |
|---|---|---|
| JP | 4528262 B2 | 8/2010 |
| JP | 2014-096043 A | 5/2014 |
| JP | WO2015/136938 A1 | 4/2017 |
| JP | 2018-527682 A | 9/2018 |
| JP | 2019-021149 A | 2/2019 |
| JP | 2019-040410 A | 3/2019 |
| JP | 2020-055691 A | 4/2020 |
| JP | WO2020/075280 A1 | 9/2021 |
| WO | 2018/115853 A1 | 6/2018 |

OTHER PUBLICATIONS

JP Office Office Communication for JP Application No. 2022-036865, mailed on May 18, 2023 with English Translation.
International Search Report for PCT Application No. PCT/JP2020/025713, mailed on Sep. 29, 2020.
Extended European Search Report for EP Application No. 20943745.8, dated on Jul. 10, 2023.

* cited by examiner

FIG. 2

| No | ITEM NAME |
|---|---|
| 1 | USER ID |
| 2 | REGISTERED FACE IMAGE |
| 3 | FEATURE AMOUNT |
| 4 | PASSENGER NAME |
| 5 | RESERVATION NUMBER |
| 6 | ORIGIN |
| 7 | DESTINATION |
| 8 | DATE OF FLIGHT |
| 9 | AIRLINE CODE |
| 10 | FLIGHT NUMBER |
| 11 | SEAT NUMBER |
| 12 | NATIONALITY |
| 13 | PASSPORT NUMBER |
| 14 | FAMILY NAME |
| 15 | FIRST NAME |
| 16 | DATE OF BIRTH |
| 17 | GENDER |
| 18 | TRUSTEE BAGGAGE ID |
| 19 | STATUS(TP1) |
| 20 | STATUS(TP2) |
| 21 | STATUS(TP3) |
| 22 | STATUS(TP4) |
| 23 | STATUS(TP5) |
| 24 | STATUS(TP6) |
| 25 | STATUS(TP7) |

FIG. 3

| No | ITEM NAME |
|---|---|
| 1 | TRUSTEE BAGGAGE ID |
| 2 | FLIGHT NUMBER |
| 3 | STATUS |
| 4 | CURRENT LOCATION |
| 5 | TEMPORARY STORAGE LOCATION |
| 6 | FINAL DESTINATION |

FIG. 4

| No | ITEM NAME |
|---|---|
| 1 | TRUSTEE BAGGAGE ID |
| 2 | FLIGHT NUMBER |
| 3 | STATUS |
| 4 | CURRENT LOCATION |
| 5 | TEMPORARY STORAGE LOCATION |
| 6 | BAGGAGE CLAIM ID |
| 7 | START TIME OF PICKUP |

FIG. 5

| No | ITEM NAME |
|---|---|
| 1 | LOCATION ID |
| 2 | BAGGAGE CLAIM ID |
| 3 | DISTANCE BETWEEN LOCATIONS |
| 4 | MEANS OF TRANSPORTATION |
| 5 | REQUIRED TIME |

| No | ITEM NAME |
|---|---|
| 1 | TRUSTEE BAGGAGE ID |
| 2 | FLIGHT NUMBER |
| 3 | STATUS |
| 4 | CURRENT LOCATION |
| 5 | TEMPORARY STORAGE LOCATION |
| 6 | FINAL DESTINATION |
| 7 | REGISTERED BAGGAGE IMAGE |

FIG. 18

| No | ITEM NAME |
|---|---|
| 1 | TRUSTEE BAGGAGE ID |
| 2 | FLIGHT NUMBER |
| 3 | STATUS |
| 4 | CURRENT LOCATION |
| 5 | TEMPORARY STORAGE LOCATION |
| 6 | BAGGAGE CLAIM ID |
| 7 | START TIME OF PICKUP |
| 8 | REGISTERED BAGGAGE IMAGE |

INFORMATION PROCESSING APPARATUS, INFORMATION PROCESSING METHOD, AND STORAGE MEDIUM

This application is a National Stage Entry of PCT/JP2020/025713 filed on Jun. 30, 2020, the contents of all of which are incorporated herein by reference, in their entirety.

TECHNICAL FIELD

The present invention relates to an information processing apparatus, an information processing method, and a storage medium.

BACKGROUND ART

PTL 1 discloses a boarding security check system that automatically performs procedures for a user (passenger) to deposit baggage with an airline when the user (passenger) boards an aircraft.

CITATION LIST

Patent Literature

PTL 1: Japanese Patent No. 4528262

SUMMARY OF INVENTION

Technical Problem

The system described in the PTL 1 does not suggest to assist users to pick up their baggage after the aircraft arrives at an arrival airport. For this reason, there is a need for a system that allows users to efficiently pick up their baggage at the arrival airport.

Therefore, in view of the above problems, an object of the present invention is to provide an information processing apparatus, an information processing method, and a storage medium that enable users to efficiently pick up their baggage at the arrival airport.

Solution to Problem

According to one aspect of the present invention, there is provided an information processing apparatus including: a biometric information acquisition unit that acquires biometric information of a user at an arrival airport; a biometric matching unit that performs a matching process of the biometric information with registered biometric information of a registrant who deposited a baggage with the airline at a departure airport; and a guide unit that outputs guide information including a location of pickup in the arrival airport and a start time of pickup of the baggage associated with the registered biometric information to the user who is authenticated as the same person as the registrant by the matching process.

According to another aspect of the present invention, there is provided an information processing method including: acquiring biometric information of a user at an arrival airport; performing a matching process of the biometric information with registered biometric information of a registrant who deposited a baggage with the airline at a departure airport; and outputting guide information including a location of pickup in the arrival airport and a start time of pickup of the baggage associated with the registered biometric information to the user who is authenticated as the same person as the registrant by the matching process.

According to yet another aspect of the present invention, there is provided a storage medium storing a program that causes a computer to perform: acquiring biometric information of a user at an arrival airport; performing a matching process of the biometric information with registered biometric information of a registrant who deposited a baggage with the airline at a departure airport; and outputting guide information including a location of pickup in the arrival airport and a start time of pickup of the baggage associated with the registered biometric information to the user who is authenticated as the same person as the registrant by the matching process.

Advantageous Effects of Invention

According to the present invention, an information processing apparatus, an information processing method, and a storage medium that enable users to efficiently pick up baggage at an arrival airport can be provided.

BRIEF DESCRIPTION OF DRAWINGS

FIG. 2 is a diagram showing an example of information stored in a user information DB according to the first example embodiment.

FIG. 3 is a diagram showing an example of information stored in a first baggage information DB according to the first example embodiment.

FIG. 4 is a diagram showing an example of information stored in a second baggage information DB according to the first example embodiment.

FIG. 5 is a diagram showing an example of information stored in a required time information DB according to the first example embodiment.

FIG. 18 is a diagram showing an example of information stored in the second baggage information DB according to the second example embodiment.

DESCRIPTION OF EMBODIMENTS

Exemplary example embodiments of the present invention will be described below with reference to the drawings. Throughout the drawings, the same elements or corresponding elements are labeled with the same references, and the description thereof may be omitted or simplified.

First Example Embodiment

Figure 1:
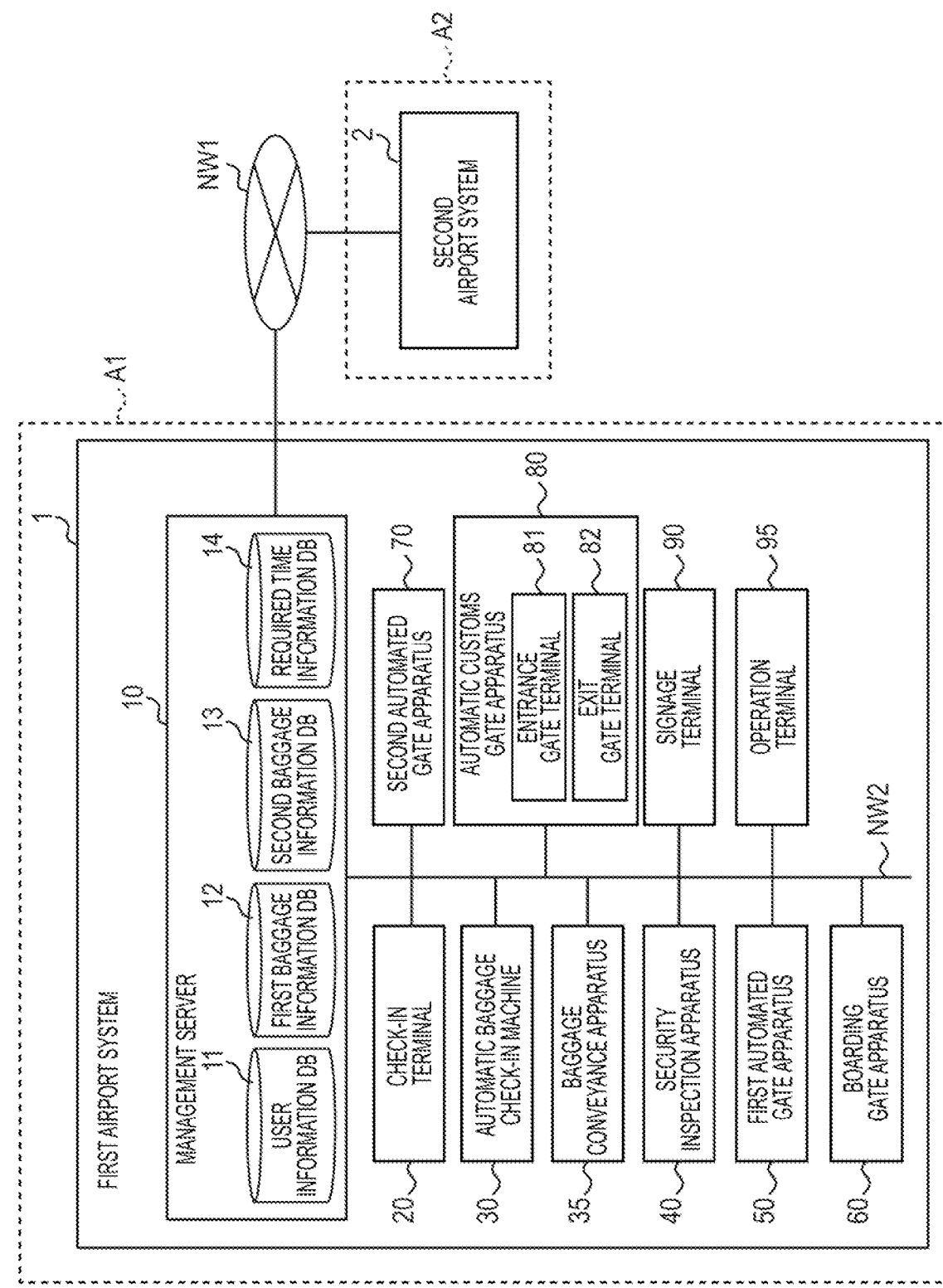
FIG. 1 is a schematic diagram showing an example of the overall configuration of an information processing system according to a first example embodiment.

FIG. 1 is a schematic diagram showing an example of the overall configuration of an information processing system according to the present example embodiment. The information processing system according to the present example embodiment is a computer system that supports a series of procedures each performed in a first country and a second country that is different from the first country, for a user (passenger). The user is scheduled to depart the first country from an airport A1 by an aircraft and enter the second country via an airport A2 in the second country, for example. The information processing system is operated by a public institution such as an immigration control bureau or a trustee entrusted with the operation from such an institution, for example. Although the present invention is described in the case of an international flight, the present invention is also applicable to a domestic flight.

As shown in FIG. 1, the information processing system includes a first airport system 1 and a second airport system 2. The first airport system 1 and the second airport system 2 are connected via a network NW1. The network NW1 is formed of a wide area network (WAN) such as the Internet. Note that only two airport systems are shown in FIG. 1 for illustrative purposes, but the number of airport systems included in the information processing system is not limited to these.

The first airport system 1 is a computer system installed at the airport A1 in the first country, which manages various procedures for entry and exit of a user. The first airport system 1 includes a management server 10, a check-in terminal 20, an automatic baggage check-in machine 30, a baggage conveyance apparatus 35, a security inspection apparatus 40, a first automated gate apparatus 50, a boarding gate apparatus 60, a second automated gate apparatus 70, an automatic customs gate apparatus 80, a signage terminal 90, and a operation terminal 95. The management server 10 is connected to other devices via a network NW2. The network NW2 is formed of the local area network (LAN), the WAN, a mobile communication network, or the like. The connection scheme may be a wireless scheme without being limited to a wired scheme.

The second airport system 2 is a computer system installed at the airport A2 in the second country and is formed of the same equipment as the first airport system 1. The system configuration of the second airport system 2 can be understood by replacing "the first airport system" with "the second airport system" and "the first country" with "the second country" respectively, so a detailed explanation is omitted.

The management server 10 is an information processing apparatus that manages various procedures at the first country when the user U enters or departs the country. The management server 10 realizes functions such as a control unit and a storage unit of the first airport system 1. The management server 10 is installed in a facility of an airport company, an airline company, or the like, for example. Note that the management server 10 is not necessarily required to be a single server and may be configured as a group including a plurality of servers.

The management server 10 verifies the identity of the user by matching a face image (biometric information) captured by the automatic baggage check-in machine 30, the security inspection apparatus 40, the first automated gate apparatus 50, the boarding gate apparatus 60, the second automated gate apparatus 70, the automatic customs gate apparatus 80, and the signage terminal 90 with registered face images registered in the database. The details will be described later.

The management server 10 includes a user information DB 11, a first baggage information DB 12, a second baggage information DB 13, and a required time information DB 14. These databases are examples, and the management server 10 may additionally have other databases. Multiple databases may also be consolidated into a single database.

The user information DB 11 is a database that stores passport information, boarding reservation information, and flight information related to users. The first baggage information DB 12 is a database that stores information on baggage (hereafter referred to as "trustee baggage") that users departing the first country have deposited with an airline prior to travel. The second baggage information DB 13 is a database that stores trustee baggage information related to users entering the first country. The required time information DB 14 is a database that stores information such as the required time from a given location to a baggage claim (baggage pickup site) in the airport and the distance between locations.

When an aircraft departs from the airport A1 to the airport A2, the second baggage information DB 13 on the side of the second airport system 2 is sequentially updated based on baggage information extracted from the first baggage information DB 12 in the first airport system 1.

FIG. 2 is a diagram showing an example of information stored in the user information DB 11. Here, the user information DB 11 has data items of a user ID, a registered face image, a feature amount, a name of passenger, a reservation number, an origin, a destination, a date of flight, an airline code, a flight number, a seat number, a nationality, a passport number, a family name, a first name, a date of birth, a gender, a trustee baggage ID, and status TP1 to TP7. These data items are examples, and the user information DB 11 may further include other data items.

The user ID is an identifier that uniquely identifies the user. In the present example embodiment, the user ID is issued provided that a result of matching between a face image acquired by capturing the user having a passport in a check-in procedure and a passport face image read from the passport is that the matching is successful.

In the present example embodiment, the expression "successful matching" indicates that a matching score regarding a similarity between biometric information of the user and registered biometric information of a registrant is greater than or equal to a predetermined threshold. Further, the expression "unsuccessful matching" indicates that a matching score is less than the predetermined threshold.

Note that, although the term of "biometric information" in the present example embodiment indicates a face image and a feature amount extracted from the face image, biometric information is not limited to a face image and a face feature amount. That is, biometric authentication may be performed by using an iris image, a fingerprint image, a palmprint image, an auricle image, or the like as the biometric information on the user.

The registered face image is a face image registered for the user. The feature amount is a value extracted from biometric information (registered face image). In the present example embodiment, the registered face image may be registered in a procedure operation that is first performed in a series of procedure operations performed when departing the first country. It is preferable that a registered face image is registered based on consent from the user and then deleted after a predetermined period.

For example, the registered face image can be registered in the user information DB 11 as well as the user ID, on the condition that the captured face image of the user holding the passport matches the passport face image read from the passport in the check-in procedure at the airport A1. Then, the registered face image, like the user ID, can be deleted from the user information DB 11 when, for example, the user has completed the customs inspection procedure at the airport A2 and has finished traveling.

As the registered face image, a face image captured in the first procedure operation at the location is used. The reason is that a face image captured in the first procedure operation is newer than a passport face image and that an image quality (appearance) is closer to an image captured in a subsequent authentication process than the passport face image. Instead of a target face image, however, a passport face image may be set as a registered face image (registered biometric information).

The reservation number is an identifier that uniquely identifies boarding reservation information. The airline code is an identifier that uniquely identifies an airline company. The trustee baggage ID is an identifier that uniquely identifies the trustee baggage. Status TP1 to TP7 indicate the progress (Incomplete/Completed) of a series of screening procedures (Check-in procedure/Baggage check-in procedure/Security inspection procedure/Departure inspection procedure/Identity confirmation at boarding gate/Entry inspection procedure/Customs inspection procedure) in entry and exit of the user.

FIG. 3 is a diagram showing an example of information stored in the first baggage information DB 12. Here, the first baggage information DB 12 has data items of a trustee baggage ID, a flight number, a status, a current location, a temporary storage location, and a final destination. These data items are examples, and the first baggage information DB 12 may further include other data items.

The status indicates the conveyance status of the trustee baggage of departed persons or prospective departing persons. For example, the status could be "in conveyance", "under inspection", "under temporary storage", "loading on aircraft completed", or the like. The current location is a location of the trustee baggage detected in the airport. The data of the current location is registered in association with the trustee baggage ID, for example, by reading the baggage tag attached to the trustee baggage by a tag reader (not shown) installed in the conveyance route of the trustee baggage. The temporary storage location indicates containers, hangars, or the like, in which the trustee baggage of prospective departing persons is temporarily stored before being conveyed to the final destination. The final destination indicates the location of the aircraft on which the trustee baggage will be loaded.

It is preferable that the status stored in the first baggage information DB 12 can be checked in the first country by the user using a signage terminal 90 or a self-operation terminal. For example, the user can check the status of the trustee baggage as follow. First, the signage terminal 90 captures a face image of the user and transmits the face image of the user to the management server 10. Next, the management server 10 matches the face image received from the signage terminal 90 with the registered face image of the registrant stored in the user information DB 11 to specify the user. Next, the management server 10 refers to the first baggage information DB 12 with the baggage ID included in the user information of the identified user as a key, and identifies the status and current location regarding the trustee baggage of the user. Then, the management server 10 makes the signage terminal 90 display guide information including the status and the current location. In this way, the user can easily check whether the trustee baggage deposited with the airline has been properly loaded on the aircraft at the time of departure.

The method of checking status is not limited to this. For example, the signage terminal 90 may provide the user with guide information including status and the current location by printing it on paper. Further, the signage terminal 90 may provide the guide information to the user by displaying a code such as a two-dimensional code recording the guide information. In this case, the user can easily capture the code using a smartphone to store the guide information in the smartphone.

FIG. 4 is a diagram showing an example of information stored in the second baggage information DB 13. Here, the second baggage information DB 13 has data items of a trustee baggage ID, a flight number, a status, a current location, a temporary storage location, a baggage claim ID, and a start time of pickup. These data items are examples, and the second baggage information DB 13 may further include other data items.

The status indicates the status of transportation with respect to the trustee baggage of entry persons or prospective entry persons. For example, statuses include "before loading/unloading operations", "loading/unloading operations completed", "in conveyance", "under inspection", "under temporary storage", and "conveyance to the baggage claim completed". The baggage claim ID is an identifier that uniquely identifies a baggage claim as a location to pick up the trustee baggage. The start time of pickup is a time when the user can pick up the trustee baggage in the baggage claim. The baggage claim ID and start time of pickup associated with the aircraft may change accordingly as the airport is congested or the arrival gate changes.

FIG. 5 is a diagram showing an example of the information stored in the required time information DB 14. Here, the required time information DB 14 has data items of a location ID, a baggage claim ID, a distance between locations, a means of transportation, and a required time. These data items are examples, and the required time information DB 14 may further include other data items.

The location ID is an identifier that uniquely identifies a location within the airport. In the present example embodiment, the location ID indicates the location where the signage terminal 90 is installed. The distance between locations is a distance between two locations corresponding to the location ID and the baggage claim ID, respectively. The means of transportation indicates a method the user can select to move from the current location to the baggage claim. For example, the means of transportation include walking, buses and trains. The means of transportation varies depending on the size and facilities of the airport. The required time is a time necessary for a user to move from their current location to the baggage claim. The required time is set for each means of transportation.

The following is a description of the devices that work with the management server 10 in the first airport system 1 and the second airport system 2 to perform procedures for users.

The check-in terminal 20 is installed in a check-in lobby or a check-in counter in the airport. Hereafter, a procedure area where the check-in terminal 20 is installed is referred to as "touch point TP1". The check-in terminal 20 is a self-service terminal used by the user and is operated by himself/herself to perform a check-in procedure (boarding procedure). After completion of a check-in procedure at the touch point TP1, the user moves to a location of the baggage claim or a security inspection site.

The automatic baggage check-in machine 30 is installed in a region adjacent to a baggage check-in counter (manned counter) or a region near the check-in terminal 20 in the airport. Hereafter, a procedure area where the automatic baggage check-in machine 30 is installed is referred to as "touch point TP2". The automatic baggage check-in machine 30 is a self-service terminal used by the user U and is operated by himself/herself to perform a procedure of checking in baggage that is not carried in a passenger cabin. After completion of a baggage check-in procedure, the user moves to the security inspection site. In a case of the user having no baggage to check in, the procedure at the touch point TP2 is omitted.

The baggage conveyance apparatus 35 is installed in a backyard of the airport. The "baggage conveyance apparatus" may include the conveyance paths constructed by belt conveyors, tag readers installed around the belt conveyors to read tag information from baggage tags attached to trustee baggage, sorting devices to sort trustee baggage based on tag information, and turntables installed in the baggage claim.

The baggage conveyance apparatus 35 automatically conveys the trustee baggage of the departing persons from the touch point TP2 to the aircraft on which the user boards. In addition, the baggage conveyance apparatus 35 automatically conveys the trustee baggage unloaded from the aircraft arriving at its destination to a baggage claim previously associated with the flight number of the aircraft.

The security inspection apparatus 40 is installed in a security inspection site within the airport (hereafter, referred to as "touch point TP3"). The "security inspection apparatus" in the present example embodiment may include a metal detector that checks whether or not the user is wearing a metal object that can be a dangerous article, an X-ray inspection apparatus that uses X-ray to check whether or not there is a dangerous article in carry-on baggage or the like, a passage control apparatus that determines whether or not to permit passage of the user U at the entrance or exit of the security inspection site, or the like. After completion of a security inspection procedure performed by the security inspection apparatus 40 at the touch point TP3, the user moves to the immigration site.

The first automated gate apparatus 50 is installed in the departure inspection site in the airport (hereafter, referred to as "touch point TP4"). The first automated gate apparatus 50 is an apparatus that automatically performs a departure inspection procedure for the user. After completion of the departure inspection procedure at the touch point TP4, the user moves to a departure area where duty-free shops or boarding gates are provided.

The boarding gate apparatus 60 is a gate apparatus installed for each boarding gate (hereafter, referred to as "touch point TP5") in the airport. The boarding gate apparatus 60 confirms whether or not the user is a passenger for an aircraft associated with the boarding gate. After completion of the procedure at the touch point TP5, the user can board the aircraft and departs the country to the second country. Thus, the check-in terminal 20, the automatic baggage check-in machine 30, the security inspection apparatus 40, the first automated gate apparatus 50, and the boarding gate apparatus 60 are used when the user departs the country.

The second automated gate apparatus 70 is installed in the entry inspection site (hereafter, referred to as "Touch Point TP6") in the airport. The second automated gate apparatus 70 is an apparatus that automatically performs a entry inspection procedure for users. The user who can use the second automated gate apparatus 70 is, for example, a person who has pre-registered for use of the second automated gate apparatus 70.

The automatic customs gate apparatus 80 is installed in a customs inspection site (hereafter, referred to as "touch point TP7") in the airport. The automatic customs gate apparatus 80 is an apparatus that automatically performs a customs inspection procedure for users. The user who can use the automatic customs gate apparatus 80 is, for example, a person who has pre-registered for use of the automatic customs gate apparatus 80. The user can enter the second country after completing the procedure in touch point TP7. Thus, the second automated gate apparatus 70 and the automatic customs gate apparatus 80 are used when the user enters the country.

The signage terminal 90 is installed at any location in the airport. The signage terminal 90 is a display terminal for presenting various kinds of information received from the management server 10 to the user. The signage terminal 90 of the present example embodiment is arranged, for example, on a moving route from the arrival gate of the aircraft to the entry inspection site or from the entry inspection site to the baggage claim.

By transmitting a captured face image of the user standing in front of the terminal to the management server 10, the signage terminal 90 receives, from the management server 10, guide information regarding such as identification information of the baggage claim for which the user picks up the trustee baggage, the start time of pickup, the means of transportation to the baggage claim. Details of the information will be discussed later.

The operation terminal 95 is a terminal used by a staff member of an airline company or the like for operation at each touch point TP1 to P7. The operation terminal 95 is a personal computer, a tablet terminal, a smartphone, or the like, for example.

Next, a hardware configuration of a device will be described. The device is related to the creation of guide information in the present example embodiment among the multiple devices constituting the information processing system described above. Note that, in multiple drawings, devices having the same name but different only by reference numerals are devices having the same function, and therefore detailed description thereof is omitted in the following drawings.

Figure 6:
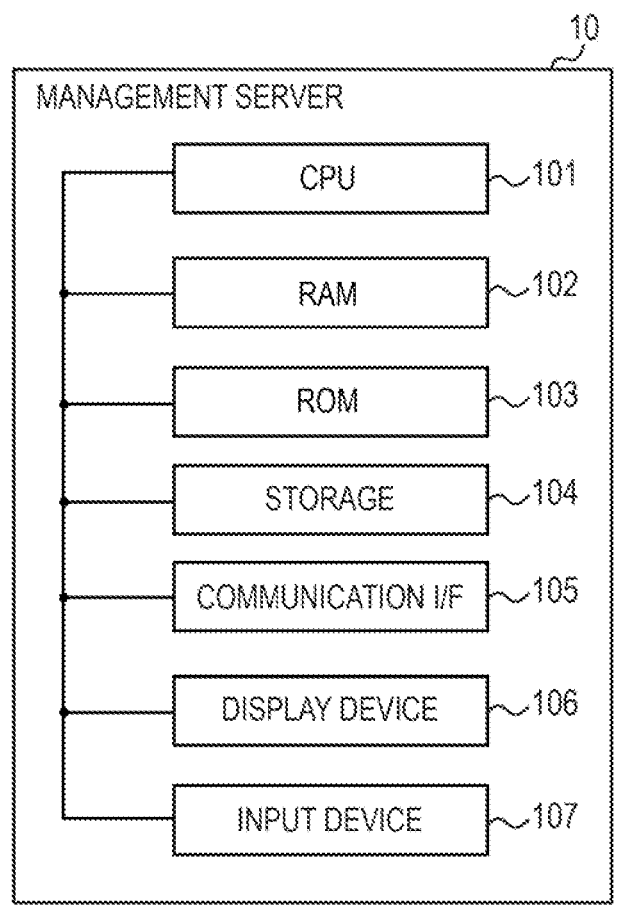
FIG. 6 is a block diagram showing an example of a hardware configuration of a management server according to the first example embodiment.

FIG. 6 is a block diagram showing an example of a hardware configuration of the management server 10. The management server 10 includes a central processing unit (CPU) 101, a random access memory (RAM) 102, a read only memory (ROM) 103, a storage 104, a communication interface (I/F) 105, a display device 106, and an input device 107 as a computer that performs calculation, control, and storage. Respective devices are connected to each other via a bus, a wiring, a drive device, or the like.

The CPU 101 is a processor having functions of performing a predetermined operation in accordance with a program stored in the ROM 103 or the storage 104 and controlling each unit of the management server 10. The RAM 102 is formed of a volatile storage medium and provides a temporary memory area required for the operation of the CPU 101.

The ROM 103 is formed of a nonvolatile storage medium and stores necessary information such as a program used for the operation of the management server 10. The storage 104 is formed of a nonvolatile storage medium and stores a program used for operating the management server 10 and data. The storage 104 is formed of a hard disk drive (HDD) or a solid state drive (SSD), for example.

The communication I/F 105 is a communication interface based on a specification such as Ethernet (registered trademark), Wi-Fi (registered trademark), 4G, or the like and is a module used for communicating with another device.

The display device 106 is a liquid crystal display, an organic light emitting diode (OLED) display, or the like used for displaying a moving image, a still image, a text, or the like and is used for presenting information to the user.

The input device 107 is a keyboard, a pointing device, a button, or the like and accepts a user operation. The display device 106 and the input device 107 may be integrally formed as a touch panel.

The CPU 101 loads a program stored in the ROM 103, the storage 104, or the like into the RAM 102 and executes the program to perform a predetermined calculation process. Further, based on the program, the CPU 101 controls each unit of the management server 10, such as the communication I/F 105.

Figure 7:
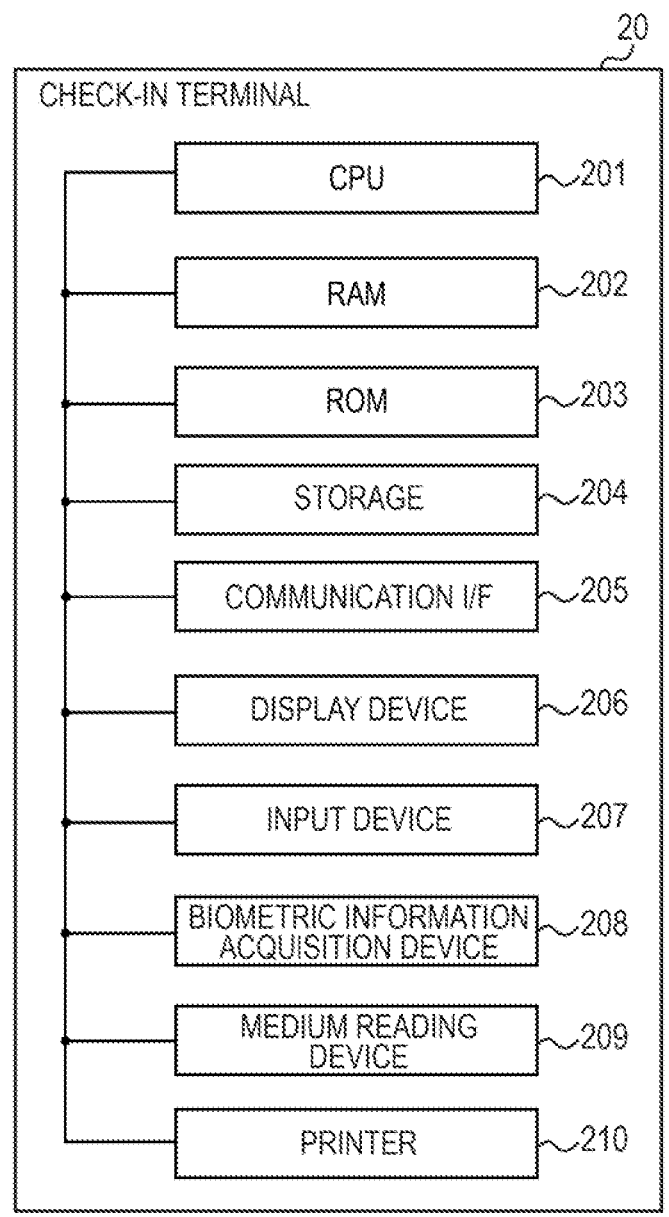
FIG. 7 is a block diagram showing an example of a hardware configuration of a check-in terminal according to the first example embodiment.

FIG. 7 is a block diagram showing an example of a hardware configuration of the check-in terminal 20. The check-in terminal 20 includes a CPU 201, a RAM 202, a ROM 203, a storage 204, a communication I/F 205, a display device 206, an input device 207, a biometric information acquisition device 208, a medium reading device 209, and a printer 210. Respective devices are connected to each other via a bus, a wiring, a drive device, or the like.

The biometric information acquisition device 208 is a device that acquires a face image of the user as biometric information of the user. The biometric information acquisition device 208 is a digital camera having, for example, a complementary metal-oxide-Semiconductor (CMOS) image sensor, a charge coupled device (CCD) image sensor or the like as light receiving elements. The biometric information acquisition device 208, for example, captures a face image of the user standing in front of the device.

The medium reading device 209 is a device that reads information stored in a medium carried by the user. Examples of the medium reading device 209 include a code reader, an image scanner, a contactless integrated circuit (IC) reader, and an optical character reader (OCR) device. In addition, as a storage medium, may be, for example, a paper airline ticket, a mobile terminal displaying a receipt of an e-ticket, or the like. Upon completion of the check-in procedure, the printer 210 prints a boarding pass printed with boarding information and guide information on the procedure until boarding.

Figure 8:
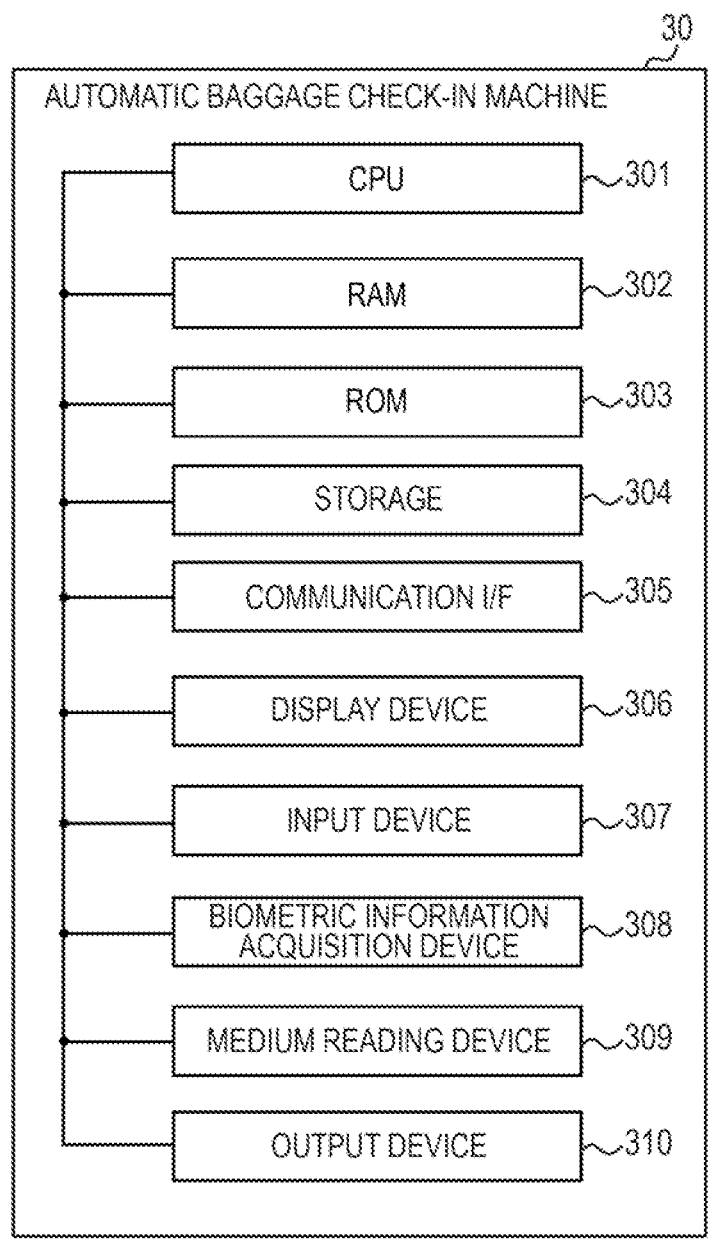
FIG. 8 is a block diagram showing an example of a hardware configuration of an automatic baggage check-in machine according to the first example embodiment.

FIG. 8 is a block diagram showing an example of a hardware configuration of the automatic baggage check-in machine 30. The automatic baggage check-in machine 30 includes a CPU 301, a RAM 302, a ROM 303, a storage 304, a communication I/F 305, a display device 306, an input device 307, a biometric information acquisition device 308, a medium reading device 309, and an output device 310.

Respective devices are connected to each other via a bus, a wiring, a drive device, or the like.

The output device 310 is a device that outputs the baggage tag attached to the trustee baggage. The baggage tag in the present example embodiment is an RFID tag equipped with an IC chip that stores tag information such as trustee baggage ID, user ID, and flight number. Also, the output device 310 further outputs a baggage claim tag necessary to redeem the trustee baggage after arriving at the destination. The baggage tag or baggage claim tag is associated with at least one of the passport number, the reservation number, and the user ID.

Figure 9:
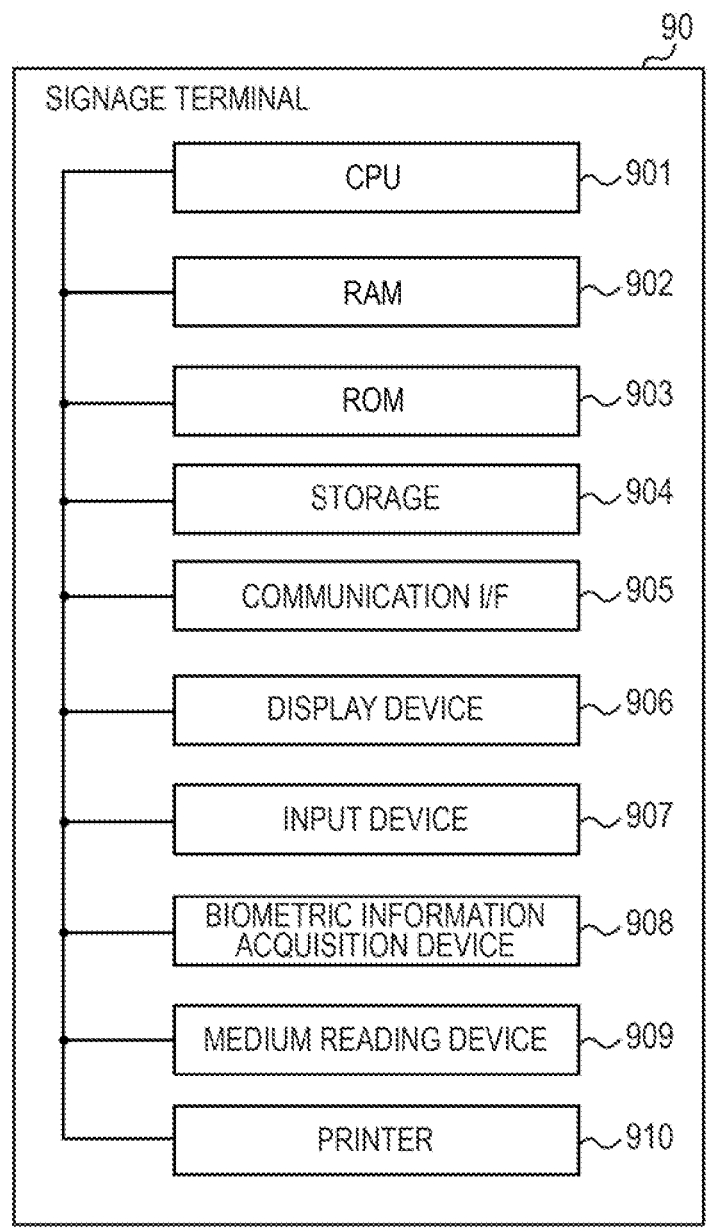
FIG. 9 is a block diagram showing an example of a hardware configuration of a signage terminal according to the first example embodiment.

FIG. 9 is a block diagram showing an example of a hardware configuration of the signage terminal 90. The signage terminal 90 includes a CPU 901, a RAM 902, a ROM 903, a storage 904, a communication I/F 905, a display device 906, an input device 907, a biometric information acquisition device 908, a medium reading device 909, and a printer 910. Respective devices are connected to each other via a bus, a wiring, a drive device, or the like.

In response to a print request from the user, the printer 910 prints guide information on paper medium. The guide information includes identification information of the baggage claim to which the trustee baggage of the user is to be conveyed, the distance from the current location to the baggage claim and the required time, the start time of pickup in the baggage claim, or the like.

Note that the hardware configuration shown in FIGS. 6 to 9 is an example, a device other than the above may be added, or some of the devices may not be provided. Further, some of the devices may be replaced with another device having substantially the same function. Further, some function in the present example embodiment may be provided by another device via the network, or the functions in the present example embodiment may be distributed to a plurality of devices and implemented therein. In such a way, the hardware configuration shown in FIGS. 6 to 9 can be changed as appropriate.

Figure 10:
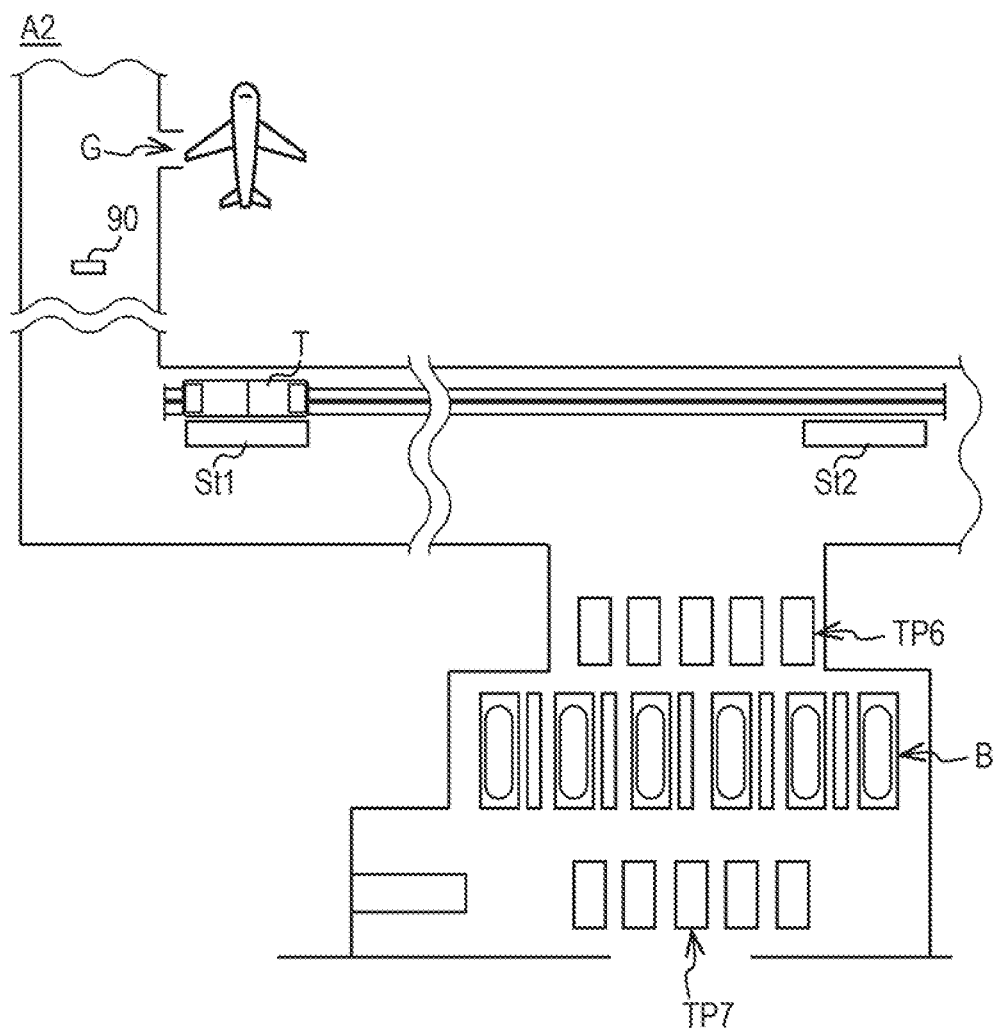
FIG. 10 is a layout diagram showing an example of a location of the signage terminal in an airport according to the first example embodiment.

FIG. 10 is a layout diagram showing an example of a location of the signage terminal 90 in the airport A2. Here, the signage terminal 90 is installed on a moving route from the arrival gate G of the airport A2 to the entry inspection site (touch point TP6). In addition, a track is laid on the moving route so that the train T can move between a station St1 on the side of the arrival gate G and a station St2 on the side of the entry inspection site. There are also six baggage claims B in the area inside the entry inspection site. After completing the entry inspection, the user picks up the trustee baggage at the baggage claim B and undergoes customs inspection procedure at the adjoining customs inspection site (touch point TP7).

Next, the operation of the device in the information processing system according to the present example embodiment is explained with reference to the drawings.

(Check-In Procedure)

Figure 11:
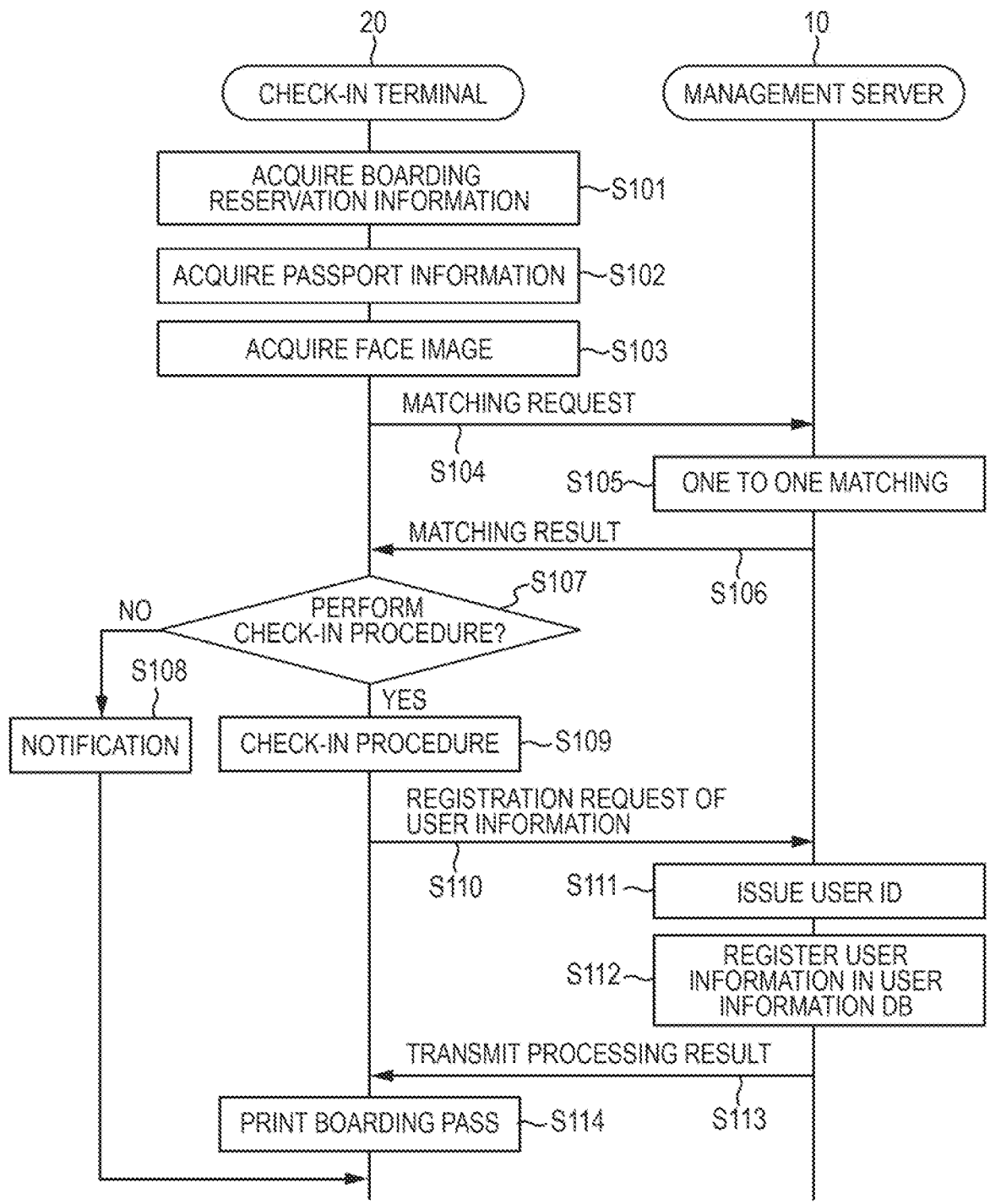
FIG. 11 is a sequence chart showing an example of a process in a check-in procedure by the information processing system according to the first example embodiment.

FIG. 11 is a sequence chart showing an example of a process during the check-in procedure of the information processing system according to the present example embodiment. This process is performed when the user performs the check-in procedure using the check-in terminal 20.

First, when an airline ticket medium such as a boarding ticket is held over the reading unit of the medium reading device 209, the check-in terminal 20 acquires boarding reservation information on the user from the airline ticket medium (step S101). The boarding reservation information includes user attribute information (family name, first name, gender, etc.) and flight information (airline code, flight number, boarding date, origin (departure airport), stopover, destination (arrival airport), seat number, boarding time, arrival time, etc.).

Next, when a passport is held over the reading unit of the medium reading device 209, the check-in terminal 20 acquires passport information on the user U from the passport (step S102). The acquired passport information includes a passport face image of the user, identity confirmation information, a passport number, information on a passport issuance country, or the like.

Next, the check-in terminal 20 captures a face image of the user as a target face image by the biometric information acquisition device 208 (step S103). Note that it is preferable that the check-in terminal 20 display a screen for obtaining consent from the user before capturing the face image.

Next, the check-in terminal 20 transmits a matching request of the face image to the management server 10 (step S104). The data of the matching request includes the captured target face image and the passport face image.

Upon receiving the information from the check-in terminal 20, the management server 10 performs a one-to-one matching between the target face image captured by the check-in terminal 20 and the passport face image of the user (step S105). The management server 10 transmits a matching result to the check-in terminal 20 (step S106).

Next, the check-in terminal 20 determines, based on the matching result received from the management server 10, whether or not the check-in procedure can be performed (step S107). When the check-in terminal 20 determines that the check-in procedure can not be performed (step S107: NO), the check-in terminal 20 notifies the user of an error message (step S108) and the process ends.

On the other hand, when the check-in terminal determines that the check-in procedure can be performed (step S107: YES), the check-in terminal 20 performs the check-in procedure such as confirmation of the itinerary and selection of the seat based on the input information of the user (step S109). Then, the check-in terminal 20 transmits a registration request of the user information to the management server 10 (step S110).

Next, the management server 10 issues a user ID (step S111). The user ID is set to a unique value based on, for example, the date and time of process, the sequence number, or the like.

Next, the management server 10 sets the target face image as a registered face image and registers the user information associating the user ID, the registered face image and the boarding reservation information in the user information DB 11 (step S112), the management server 10 transmits the processing result to the check-in terminal 20 (step S113). Data of the processing result include, for example, boarding gate numbers and guide information related to procedures until boarding an aircraft.

In the present example embodiment, the reason why a face image (target face image) captured at the location is used as the registered face image is that the validity period (life cycle) of the token ID is short, a captured image has an image quality (appearance) closer to an image captured in a subsequent authentication process than a passport face image, or the like. Instead of the target face image (captured face image), however, a passport face image may be set as a registered face image (registered biometric information).

When the check-in terminal 20 receives the processing result from the management server 10, the check-in terminal 20 prints a boarding pass with boarding reservation information and guide information on the procedure until boarding (step S114) and the process ends.

Figure 12:
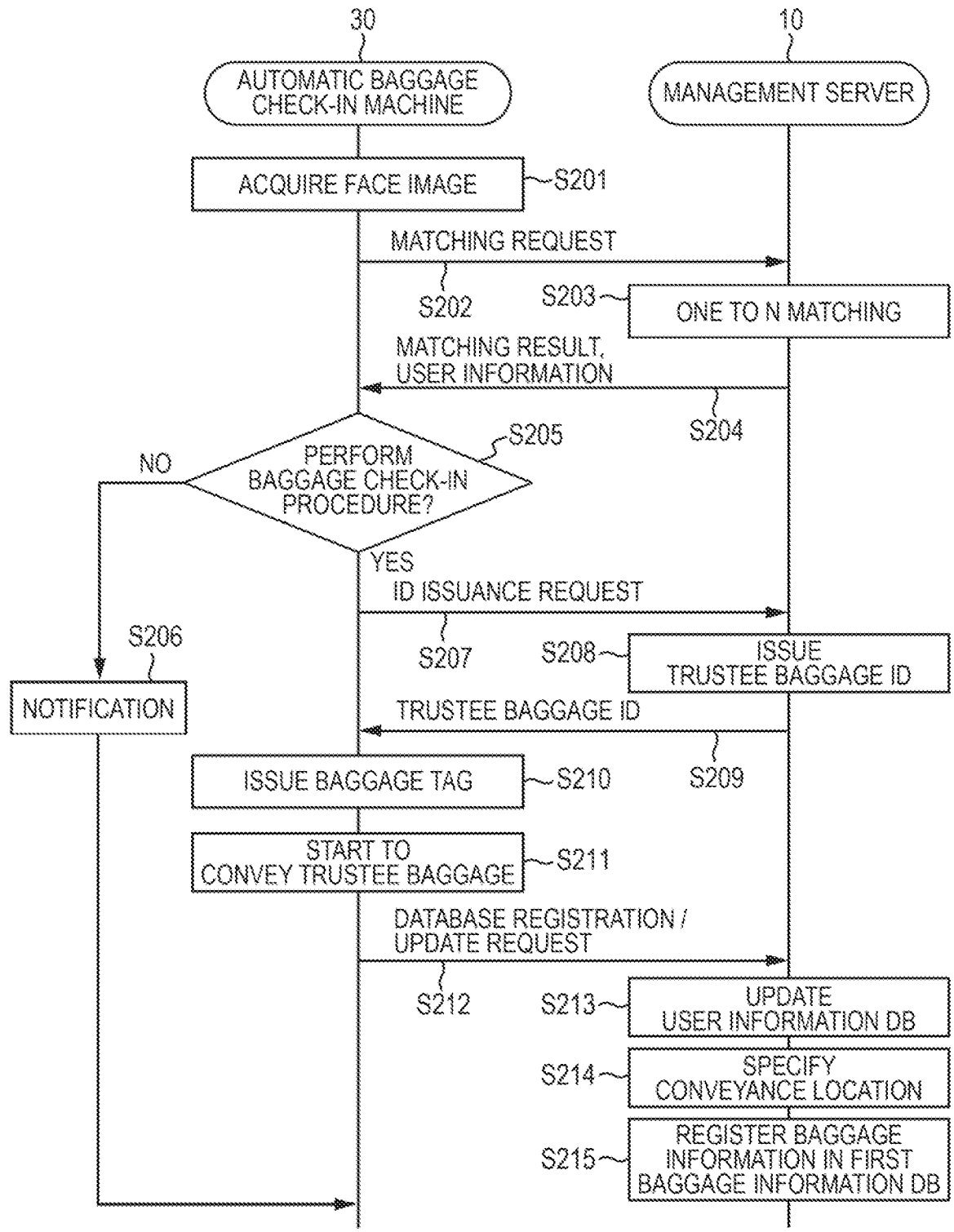
FIG. 12 is a sequence chart showing an example of a process in a baggage check-in procedure by the information processing system according to the first example embodiment.

FIG. 12 is a sequence chart showing an example of a process in the baggage check procedure by the information processing system according to the present example embodiment. This process is performed when the user who has completed the check-in procedure performs the check-in procedure as necessary.

First, when the automatic baggage check-in machine 30 detects a face of the user by the biometric information acquisition device 308, the automatic baggage check-in machine 30 captures a face image of the user (step S201).

Next, the automatic baggage check-in machine 30 transmits the face image of the user as the target face image to the management server 10 (step S202). At this time, the automatic baggage check-in machine 30 requests the management server 10 to perform a one-to-N matching between the target face image of the user and a plurality of registered face images registered in the user information DB 11 of the management server 10.

Upon receiving the target face image and the matching request from the automatic baggage check-in machine 30, the management server 10 performs the one-to-N matching between the target face image of the user and the registered face image (step S203). The management server 10 transmits a matching result to the automatic baggage check-in machine 30 (step S204). When the matching result indicates a successful matching, the management server 10 transmits the user information associated with the registered face image to the automatic baggage check-in machine 30 along with the matching result.

Upon receiving the matching result from the management server 10, the automatic baggage check-in machine 30 determines whether or not the baggage check-in procedure of the user can be performed (step S205). When the automatic baggage check-in machine 30 determines that the baggage checking procedure of the user can not be performed (step S205: NO), the automatic baggage check-in machine 30 notifies the user of an error message (step S206) and the process ends.

On the other hand, when the automatic baggage check-in machine 30 determines that the baggage check-in procedure of the user can be performed (step S205: YES), the process proceeds to step S207.

In the step S207, the automatic baggage check-in machine 30 transmits an issue request of the trustee baggage ID to the management server 10. When the management server 10 issues a unique trustee baggage ID in response to the issue request (step S208), the management server 10 transmits the trustee baggage ID to the automatic baggage check-in machine 30 (step S209).

Next, the automatic baggage check-in machine 30 issues a baggage tag (step S210). The baggage tag stores the trustee baggage ID and user information received from the management server 10. The user attaches the baggage tag to the trustee baggage in accordance with the guide information displayed on the display device 306 of the automatic baggage check-in machine 30.

Next, the automatic baggage check-in machine 30 starts to convey the trustee baggage placed in a storage after the baggage tag is attached to the trustee baggage (step S211).

Next, the automatic baggage check-in machine 30 transmits a database registration/update request to the management server 10 (step S212).

Upon receiving the database registration/update request from the automatic baggage check-in machine 30, the management server 10 updates the user information DB 11 to associate the trustee baggage ID with the user ID and the registered biometric information (step S213).

Next, the management server 10 specifies the conveyance location of the trustee baggage based on the flight number of the aircraft on which the user is scheduled to board (step S214). Specifically, the management server 10 refers to an airport management table (not shown) that associates the flight number of the aircraft with the conveyance location of the trustee baggage to specify the conveyance location.

Then, the management server 10 registers the baggage information in the first baggage information DB 12 (step S215) and the process ends. The registered face image of the user information DB 11 and the baggage information of the first baggage information DB 12 are associated by the trustee baggage ID.

(Coordination Between the Airport System of the First Country and the Airport System of the Second Country)

Figure 13:
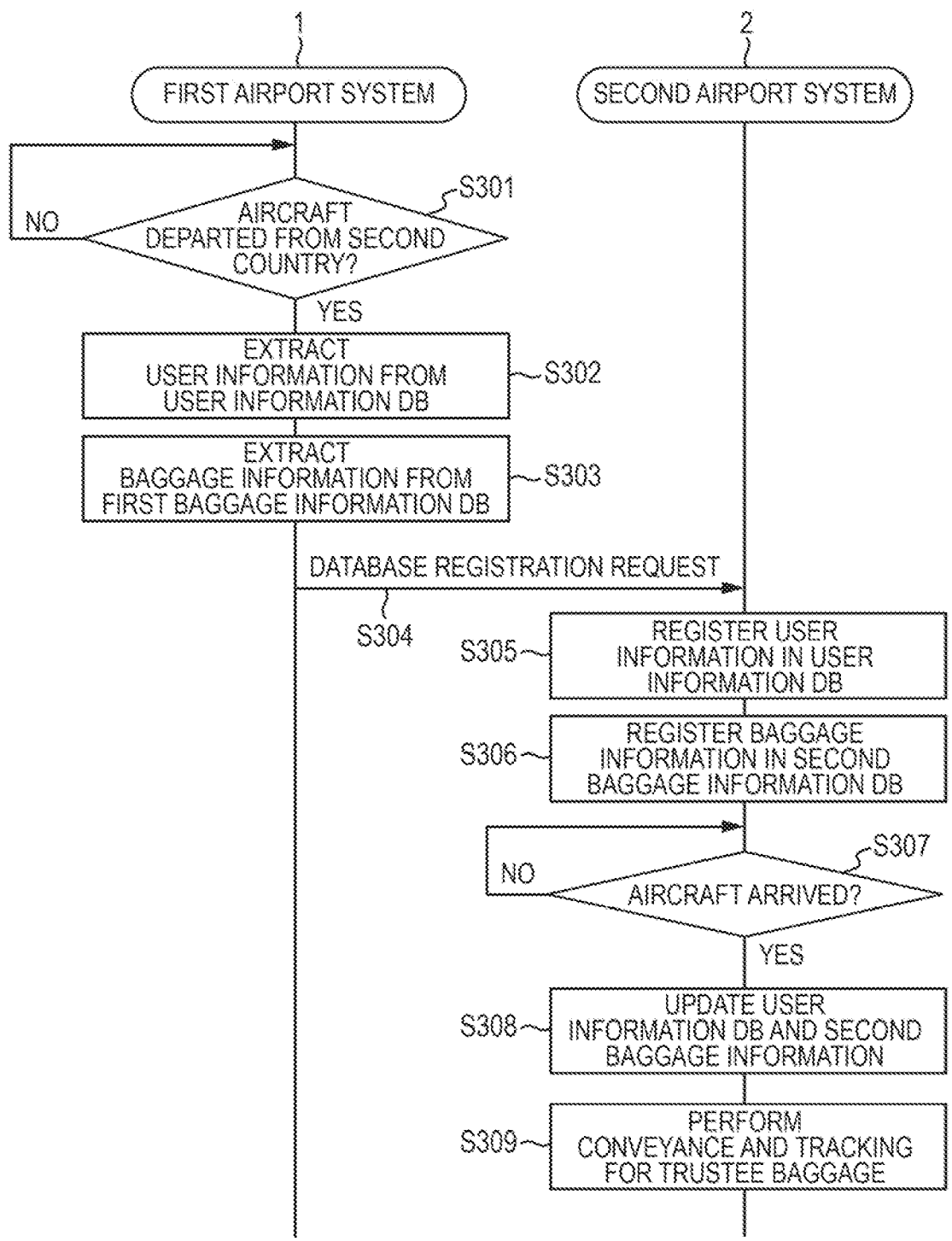
FIG. 13 is a sequence chart showing an example of a process between the first airport system and the second airport system by the information processing system according to the first example embodiment.

FIG. 13 is a sequence chart showing an example of a process between the first airport system 1 and the second airport system 2 in the information processing system according to the present example embodiment. This process is performed, for example, between the time the aircraft departs the airport A1 in the first country and the time the aircraft arrives at the airport A2 in the second country.

First, the management server 10 of the first airport system 1 determines whether or not the aircraft has departed to the second country (step S301). When the management server 10 of the first airport system 1 determines that the aircraft has departed to the second country (step S301: YES), the process proceeds to step S302.

On the other hand, when the management server 10 of the first airport system 1 determines that the aircraft has not departed to the second country (step S301: NO), the process of step S301 is repeated at a predetermined cycle.

In step S302, the management server 10 of the first airport system 1 extracts user information from the user information DB 11 with respect to the passengers of the aircraft departing for the second country.

Next, the management server 10 of the first airport system 1 extracts baggage information from the first baggage information DB 12 using the trustee baggage ID included in the user information as a key (step S303).

Next, the management server 10 of the first airport system 1 transmits the extracted user information and baggage information to the second airport system 2 of the second country to transmit a database registration request (step S304).

Next, when the management server 10 of the second airport system 2 receives the user information and baggage information related to passengers from the management server 10 of the first airport system 1, the management server 10 registers the user information in the user information DB 11 (step S305). That is, user information related to the person scheduled to enter the country is registered in the user information DB 11 of the second country.

Next, the management server 10 of the second airport system 2 registers baggage information in the second baggage information DB 13 (step S306). That is, the baggage information related to prospective entry persons is registered in the second baggage information database 13 of the second country. The status of baggage at the time of registration shall be, for example, "in conveyance".

Next, the management server 10 of the second airport system 2 determines whether or not the aircraft has arrived at the airport A2 of the second country (step S307). When the management server 10 of the second airport system 2 determines that the aircraft has arrived at the airport A2 (step S307: YES), the process proceeds to step S308.

On the other hand, when the management server 10 of the second airport system 2 determines that the aircraft has not arrived at the airport A2 (step S307: NO), the process of step S307 is repeated.

Next, the management server 10 of the second airport system 2 updates the user information DB 11 and the second baggage information DB 13, respectively (step S308). For example, the management server 10 of the second airport system 2 updates the status (TP6) of the entry inspection procedure in the user information DB 11 to "before the procedure" and the status of the trustee baggage in the second baggage information DB 13 to "before loading/unloading operations".

When the trustee baggage of the passenger is unloaded from the aircraft, the management server 10 of the second airport system 2 performs conveyance and tracking of the trustee baggage in cooperation with the baggage conveyance apparatus 35 (step S309).

(Tracking Trustee Baggage at Arrival Airport)

Figure 14:
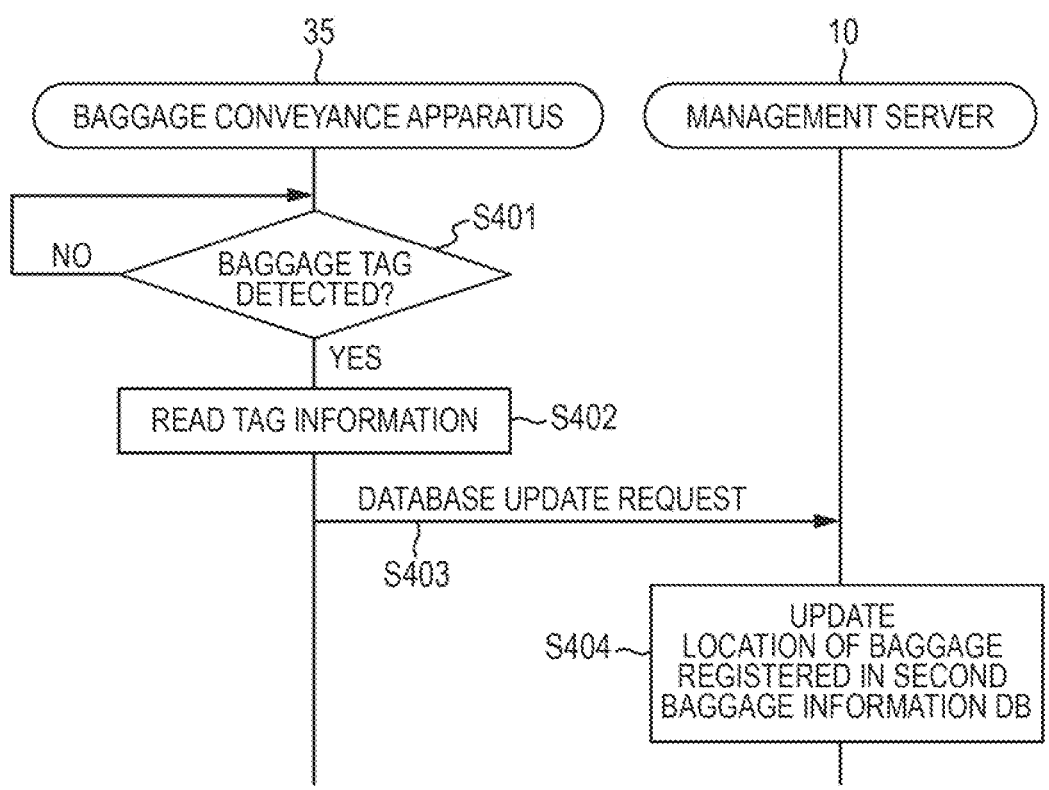
FIG. 14 is a sequence chart showing an example of a process during the conveyance of trustee baggage at an airport in the second country of the information processing system according to the first example embodiment.

FIG. 14 is a sequence chart showing an example of the processing of the information processing system according to the present example embodiment during the conveyance of trustee baggage in the airport A2 of the second country. This process is performed continuously during business hours at the airport A2.

First, the baggage conveyance apparatus 35 determines whether or not tag readers installed in a dispersed manner on the conveyance path have detected the baggage tag of the baggage being conveyed on the belt conveyor (step S401).

When the baggage conveyance apparatus 35 determines that the baggage tag of the trustee baggage has been detected (step S401: YES), the process proceeds to step S402. On the other hand, when the baggage conveyance apparatus 35 determines that the baggage tag of the trustee baggage has not been detected (step S401: NO), the process of step S401 is repeated.

In step S402, the baggage conveyance apparatus 35 reads the baggage tag of the trustee baggage by the tag reader and transmits tag information and a location ID indicating the location of the tag reader to the management server 10. The tag information includes a trustee baggage ID.

Next, the baggage conveyance apparatus 35 transmits a database update request to the management server 10 (step S403).

When receiving the tag information and the location ID from the baggage conveyance apparatus 35, the management server 10 updates the baggage location (current location) registered in the second baggage information DB 13 using the information as a key (step S404).

(Guide for Picking Up Trustee Baggage)

Figure 15:
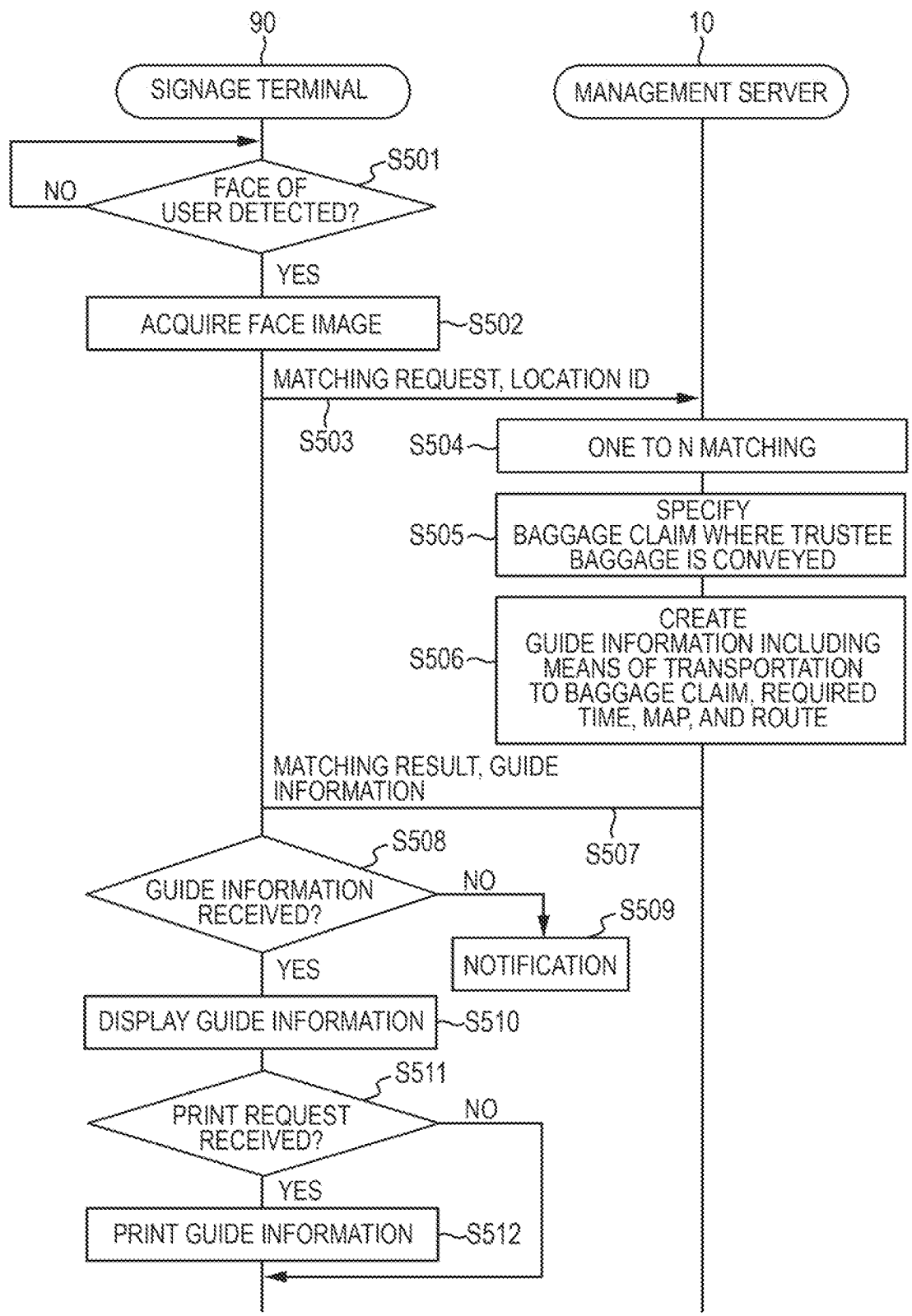
FIG. 15 is a sequence chart showing an example of a guide process of baggage information in the airport of the second country performed by the information processing system according to the first example embodiment.

FIG. 15 is a sequence chart showing an example of guide process of baggage information in the airport A2 of the second country performed by the information processing system according to the present example embodiment.

First, the signage terminal 90 continuously or periodically captures images of an area in front of the signage terminal 90 by using the biometric information acquisition device 908 and determines whether or not the face of the user has been detected (step S501).

Next, the signage terminal 90 acquires, as a target face image, the face image of the user standing in front of the signage terminal 90 in a captured image (step S502).

Next, the signage terminal 90 transmits data of the matching request including the face image of the user as a target face image and a location ID indicating the location of the signage terminal 90 to the management server 10 (step S503). In this way, the signage terminal 90 requests the management server 10 to perform a one-to-N matching between the captured target face image of the user and a plurality of registered face images registered in the database of the management server 10.

Next, the management server 10 performs the one-to-N matching between the target face image of the user received from the signage terminal 90 and the registered face image stored in the user information DB 11 (step S504). In this case, when the matching result is a successful matching, the user is authenticated as the same person as the registrant. The user ID and the trustee baggage ID associated with the registered face image are specified.

Next, the management server 10 references the second baggage information DB 13 with the baggage ID specified by the matching process as a key and specifies the baggage claim to which the baggage is to be conveyed (step S505).

Next, the management server 10 references the location ID indicating a current location of the user and the required time information DB 14 based on the baggage claim ID, and generates guide information including the means of transportation to the baggage claim, the required time, the map, the route, or the like (step S506).

Next, the management server 10 transmits the matching result and guide information to the signage terminal 90 (step S507). However, if the user could not be authenticated in the matching process in step S504, the guide information is not included in the transmission data.

Next, the signage terminal 90 determines whether or not the guide information is included in the received data from the management server 10 (step S508).

When the signage terminal 90 determines that the received data includes the guide information (step S508: YES), the signage terminal 90 displays guide information for the user (step S510), and the process proceeds to step S511.

On the other hand, when the signage terminal 90 determines that the guide information is not included in the received data (step S508: NO), the signage terminal 90 notifies the user of an error message (step S509) and the process ends. For example, this is the case when face matching fails.

In step S511, the signage terminal 90 determines whether or not a print request for the guide information has been received from the user. When the signage terminal 90 determines that the print request for the guide information has been received (step S511: YES), the process proceeds to step S512. On the other hand, when the signage terminal 90 determines that the print request for the guide information has not been received (step S511: NO), the process ends.

In step S512, the signage terminal 90 prints the guide information displayed on the screen on a paper medium and the process ends.

Figures 16, 17:
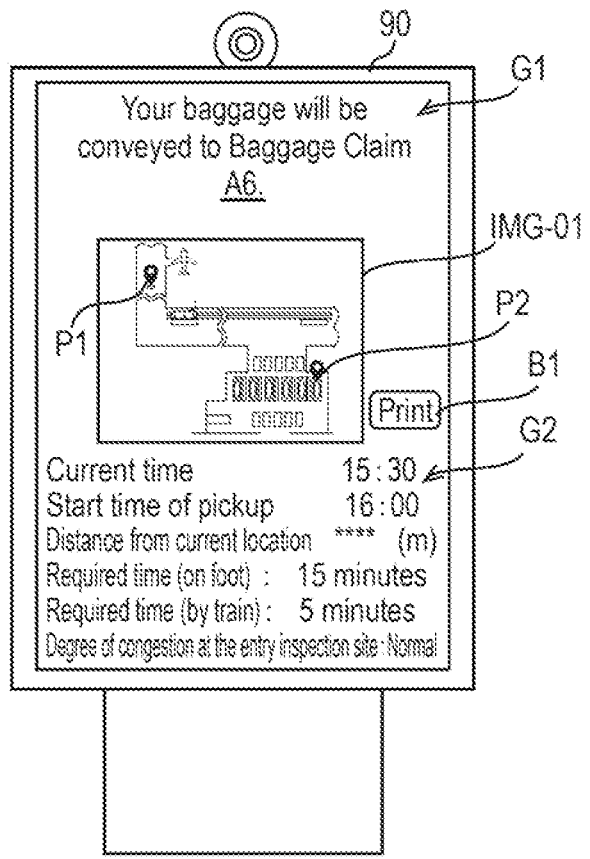
FIG. 16 is a diagram showing an example of a screen displayed on a signage terminal according to the first example embodiment.
FIG. 17 is a diagram showing an example of information stored in the first baggage information DB according to a second example embodiment.

FIG. 16 is a diagram showing an example of a screen displayed on the signage terminal 90. The screen is shown that displays information to authorized users about receiving trustee baggage. The screen includes information G1 that guides the user to the ID of the baggage claim, which is the baggage claim area, various information G2, and a print button B1 for the user to request printing of the information. The information G1 includes the following message. "Your baggage will be conveyed to Baggage Claim A6." The information G2 includes a current location P1 of the user, a location P2 of the baggage claim, a map image IMG-01 that guides the route, a current time, a start time to pick up the baggage, a distance from the current location to the baggage claim, a required time for each means of transportation, and a degree of congestion at the entry inspection site.

Note that, information displayed on the signage terminal 90 is not limited to these. For example, if the baggage has already been conveyed to the baggage claim, instead of the start time of pickup, it is preferable to display the status ("Conveyance to the baggage claim completed") indicating that pickup of the baggage has started, the remaining time until the pickup end, the elapsed time since the baggage has already been conveyed to the baggage claim, or the like. In addition, if the baggage has not been conveyed to the baggage claim, it is preferable to display the status such as "before loading/unloading operations", "loading/unloading operations completed", "in conveyance", "under inspection", "under temporary storage".

Conventionally, in order for the user to pick up the trustee baggage at the arrival airport, the user needed to check an information board disposed in the airport, for example, using the flight number of the aircraft on the boarding pass as a clue, and move to the baggage claim of the destination. However, the size of the airport and the language used at the destination vary. For this reason, it sometimes took time and effort for users to pick up their trustee baggage after getting off the aircraft.

On the other hand, according to the present example embodiment, the user can know in advance the time until his/her baggage is conveyed to the baggage claim while standing in front of the signage terminal 90 or performing face authentificion while passing in front of the signage terminal 90. The user can move after sufficiently checking such as the means of transportation, the required time, and the route to the baggage claim. Thereby, the user can efficiently pick up the trustee baggage.

Second Example Embodiment

The information processing system according to the present example embodiment will be described below. Note that references common to the references given in the drawings of the first example embodiment refer to the same objects. Description of the features common to those in the first example embodiment will be omitted, and different features will be described in detail.

FIG. 17 is a diagram showing an example of information stored in the first baggage information DB 12 according to the present example embodiment. In addition, FIG. 18 is a diagram showing an example of information stored in the second baggage information DB 13 according to the present example embodiment. As shown in FIG. 17 and FIG. 18, the first baggage information DB 12 and the second baggage information DB 13 according to the present example embodiment further include a registered baggage image as a data item, unlike the case of the first example embodiment. The registered baggage image is an image that is captured when the user deposited the trustee baggage at the departure airport and is registered in the management server 10.

Figure 19:
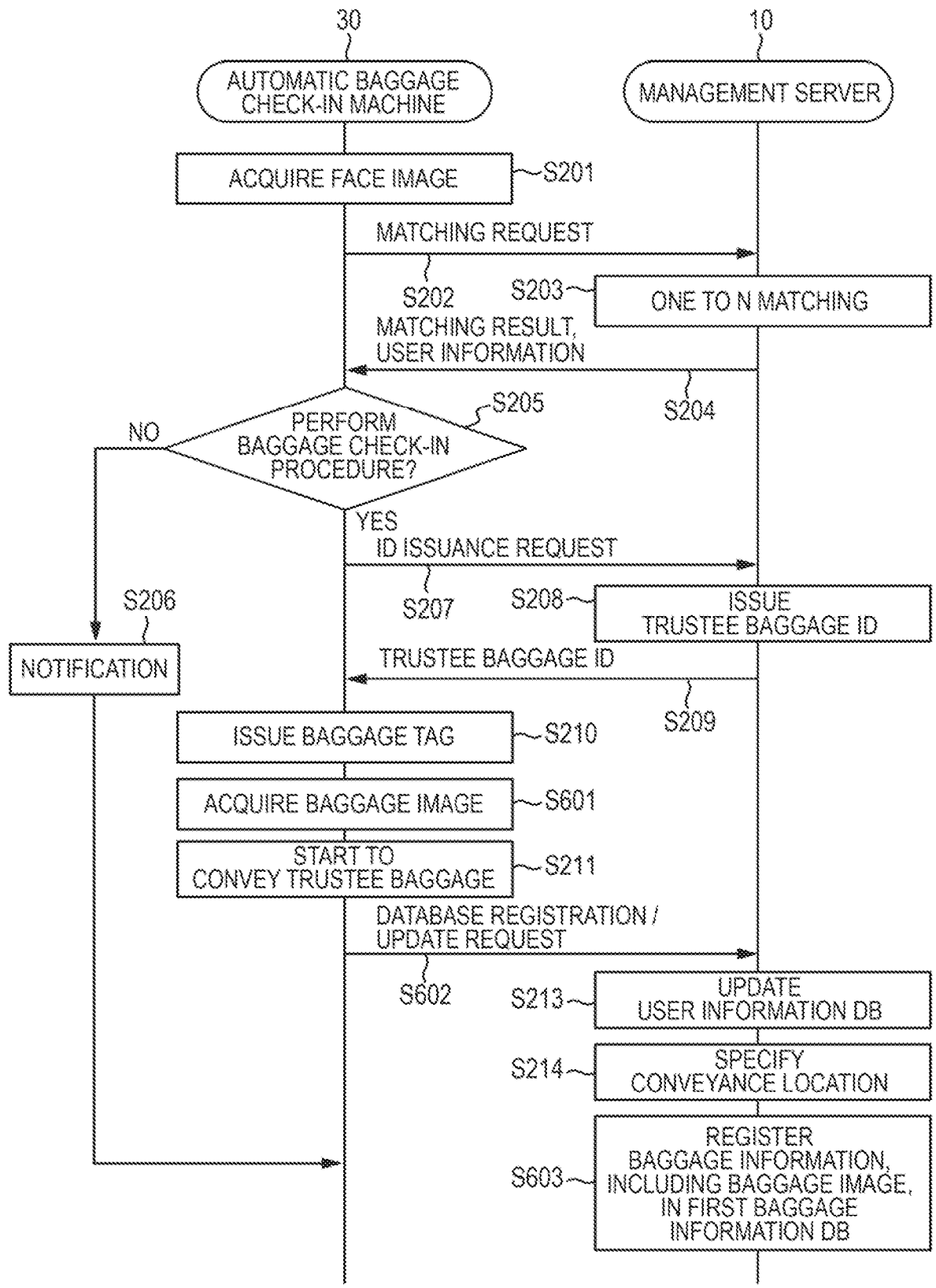
FIG. 19 is a sequence chart showing an example of a process in the baggage check-in procedure of the information processing system according to the second example embodiment.

FIG. 19 is a sequence chart showing an example of a process in the baggage check-in procedure of the information processing system according to the present example embodiment. The process of FIG. 19 differs from the flowchart of FIG. 12 only in steps S601, S602 and S603. For this reason, the differences are explained below.

In step S601, the automatic baggage check-in machine 30 captures a baggage image of the trustee baggage that is deposited by the user. Then, the process proceeds to step S211.

In step S602, the automatic baggage check-in machine 30 transmits a database registration/update request to the management server 10. Data of the database registration/update request data includes a user ID, a trustee baggage ID, and the baggage image.

In step S603, the management server 10 registers the baggage information in the first baggage information DB based on the baggage ID and the baggage image, and the process ends.

(Tracking Trustee Baggage at Arrival Airport)

Figure 20:
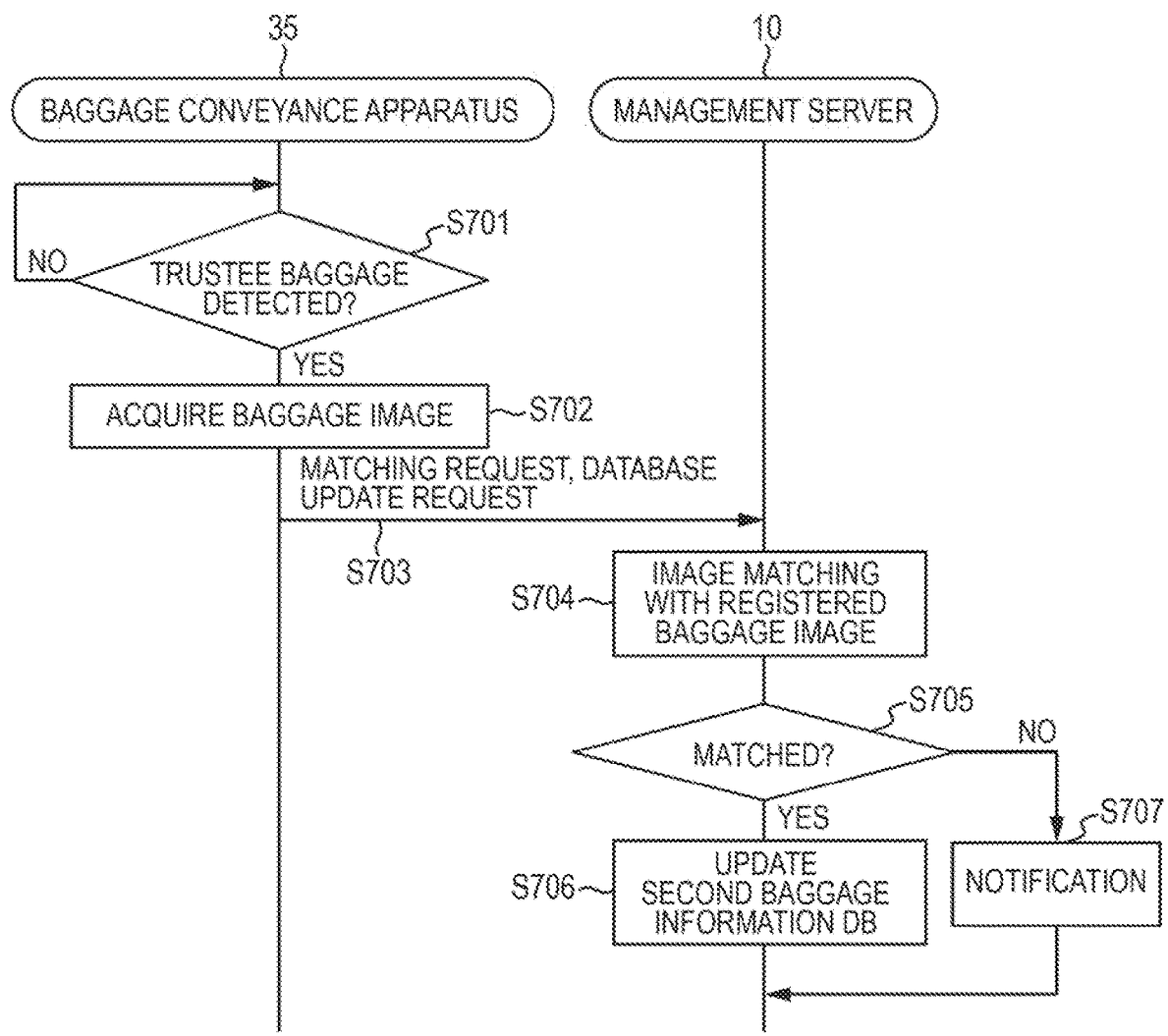
FIG. 20 is a sequence chart showing an example of a process during the conveyance of the trustee baggage at an airport in the second country of the information processing system according to the second example embodiment.

FIG. 20 is a sequence chart showing an example of a process of the information processing system according to the present example embodiment during the conveyance of the trustee baggage in the airport A2 of the second country. This process is performed continuously during business hours at the airport A2.

First, the baggage conveyance apparatus 35 determines whether or not the sensor devices (not shown) installed in a dispersed manner on the conveyance path have detected the baggage being conveyed on the belt conveyor (step S701).

When the baggage conveyance apparatus 35 determines that the trustee baggage has been detected (step S701: YES), the process proceeds to step S702. On the other hand, when the baggage conveyance apparatus 35 determines that the trustee baggage has not been detected (step S701: NO), the process of step S701 is repeated.

In step S702, the baggage conveyance apparatus 35 captures a baggage image of the trustee baggage from above, for example.

Next, the baggage conveyance apparatus 35 transmits a matching request for matching with the baggage image and a database update request to the management server 10 (step S703). Data of the matching request includes the baggage image. Data of the database update request includes the location ID, which indicates the location where the trustee baggage is detected.

Next, the management server 10 performs a one-to-N image matching between the baggage image received from the baggage conveyance apparatus 35 and the registered baggage image stored in the second baggage information DB 13 (step S704).

Next, the management server 10 determines whether the matching result of the image matching is a successful matching (step S705). When the management server 10 determines that the matching result is a successful matching (step S705: YES), the process proceeds to step S706.

On the other hand, when the management server 10 determines that the matching result is an unsuccessful matching (step S705: NO), the process proceeds to step S707.

In step S706, the management server 10 updates the second baggage information DB 13 based on the trustee baggage ID specified by the matching process in step S704 and the location ID received from the baggage conveyance apparatus 35.

In step S707, the management server 10 transmits error information indicating that the baggage whose owner is unknown is being conveyed to the operation terminal 95 used by a staff of airport and the process ends. The error information includes, for example, the location ID and the baggage image.

(Information Related to Picking Up Trustee Baggage)

Figure 21:
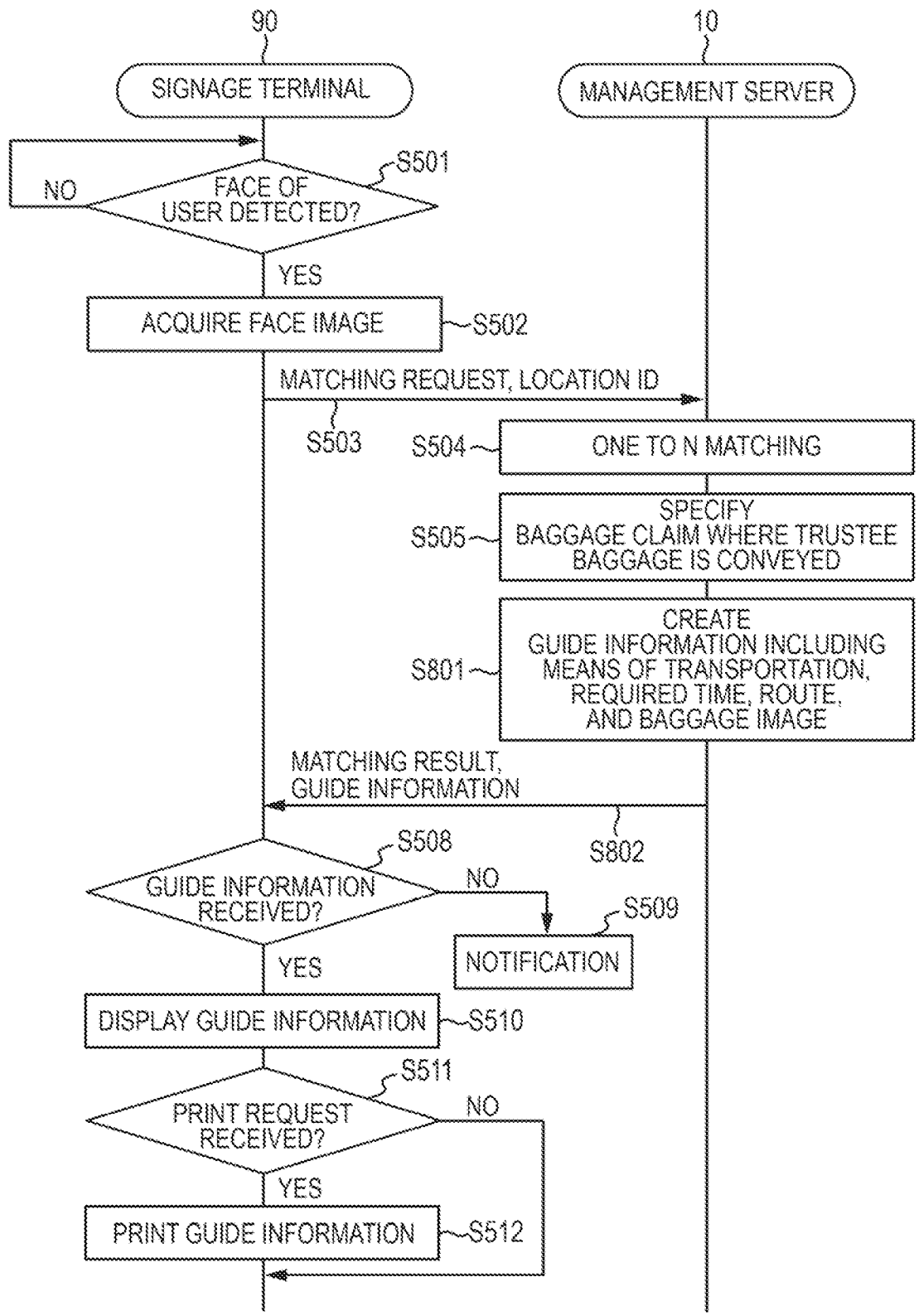
FIG. 21 is a sequence chart showing an example of a guide process of baggage information in the airport of the second country performed by the information processing system according to the second example embodiment.

FIG. 21 is a sequence chart showing an example of a guide process of baggage information in the airport A2 of the second country performed by the information processing system according to the present example embodiment. The process of FIG. 21 differs from the flowchart of FIG. 15 in the first example embodiment in steps S801 and S802.

In step S801, the management server 10 refers to the required time information DB 14 based on the location ID indicating the current location of the user and the identified baggage claim ID. Then, the management server 10 generates guide information including such as the means of transportation, the required time, the route to the baggage claim, and the baggage image.

In step S802, the management server 10 transmits the matching result and guide information to the signage terminal 90. When the result of the matching process in step S504 is an unsuccessful matching, the guide information is not created, so the management server 10 transmits only the matching result indicating the unsuccessful matching. Then, the process proceeds to step S508.

Figure 22:
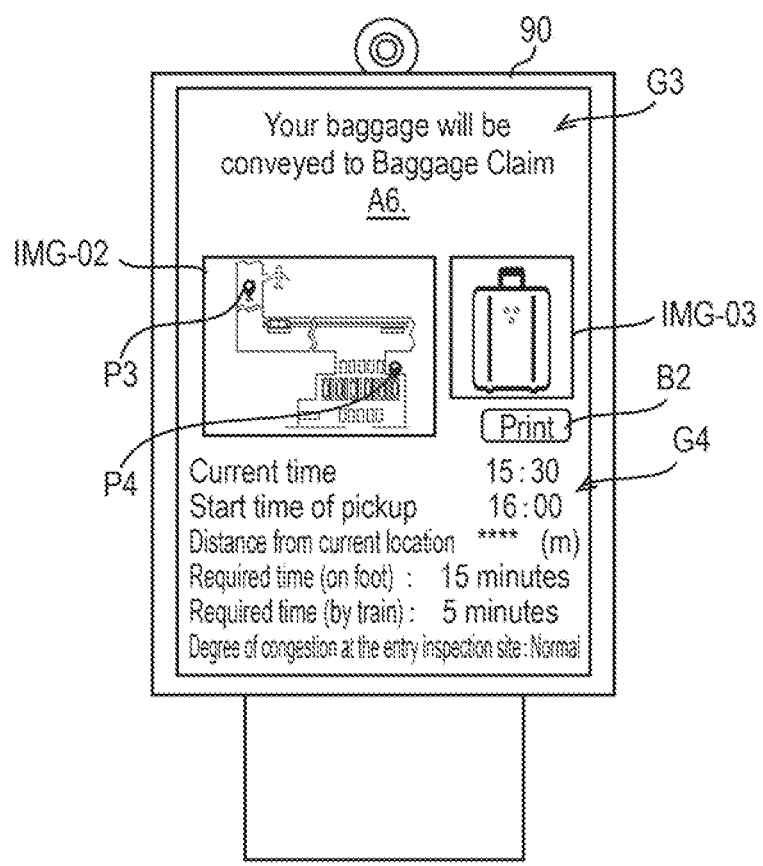
FIG. 22 is a diagram showing an example of a screen displayed on the signage terminal according to the second example embodiment.

FIG. 22 is a diagram showing an example of a screen displayed on the signage terminal 90 according to the present example embodiment. Here, the screen is shown that displays information related to picking up the trustee baggage to authorized users. The screen includes information G3 which guides the user to the ID of the baggage claim which is the location of baggage claim, various information G4, a baggage image IMG-03 of the baggage deposited by the user at the departure airport, and a print button B2 for the user to request printing of the information. The information G3 includes the following message. "Your baggage will be conveyed to Baggage Claim A6." The guide information G4 includes a current location P3 of the user, a location P4 of the baggage claim, a map image IMG-02 that guides the route, a current time, a start time to pick up the baggage, a distance from the current location to the baggage claim, a required time for each means of transportation, a degree of congestion at the entry inspection site, or the like.

Information displayed on the signage terminal 90 is not limited to these. For example, when the baggage has already been conveyed to the baggage claim, instead of the start time of pickup, it is preferable to display a status ("Conveyance to the baggage claim completed") indicating that the pickup of the baggage has started, a remaining time until the pickup ends, an elapsed time since the baggage had been conveyed to the baggage claim or the like. In addition, when the baggage has not been conveyed to the baggage claim, it is preferable to display a status such as "before loading/unloading operations", "loading/unloading operations completed, "in conveyance", "under inspection", "under temporary storage", or the like.

According to the present example embodiment, as in the case of the first example embodiment, since the user can move after sufficiently checking such as the means of transportation, the required time, and the route to the baggage claim. Thereby, the user can efficiently pick up the trustee baggage. The user can also check whether or not the displayed baggage is his/her baggage.

Third Example Embodiment

The information processing system according to the present example embodiment will be described below. Note that references common to the references given in the drawings of the first and second example embodiment refer to the same objects. Description of the features common to those in the first and second example embodiment will be omitted, and different features will be described in detail.

The information processing system according to the present example embodiment differs from the first and second example embodiment. The difference is that the system further includes a function for confirming whether or not a combination of the user and the baggage carried by the user at the customs inspection site of the second country matches a combination of a person who deposited the baggage in the first country and the trustee baggage.

Figure 23:
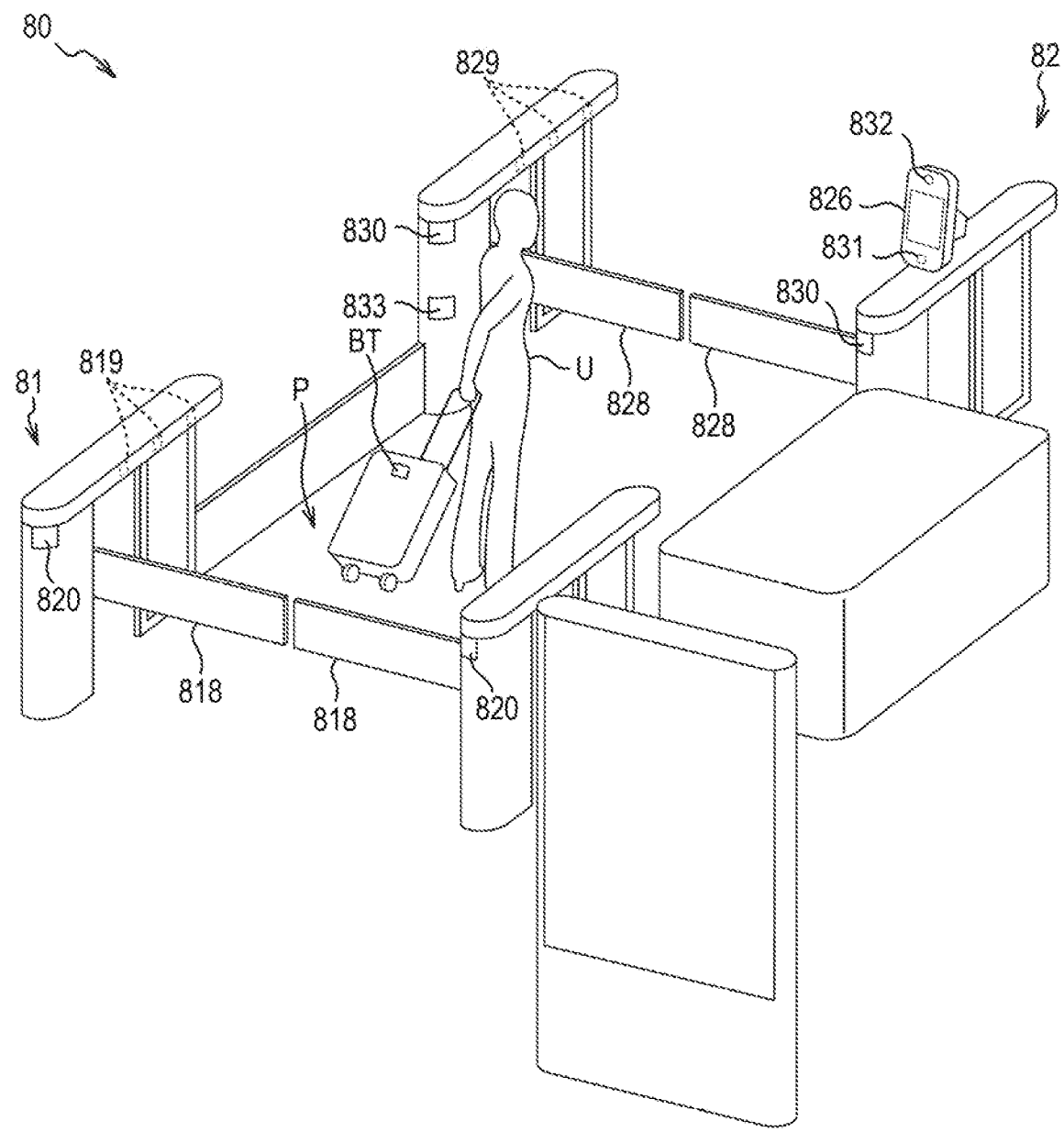
FIG. 23 is a schematic diagram showing an example of an appearance of the entrance gate terminal and the exit gate terminal constituting the automatic customs gate apparatus according to a third embodiment.
Figure 24:
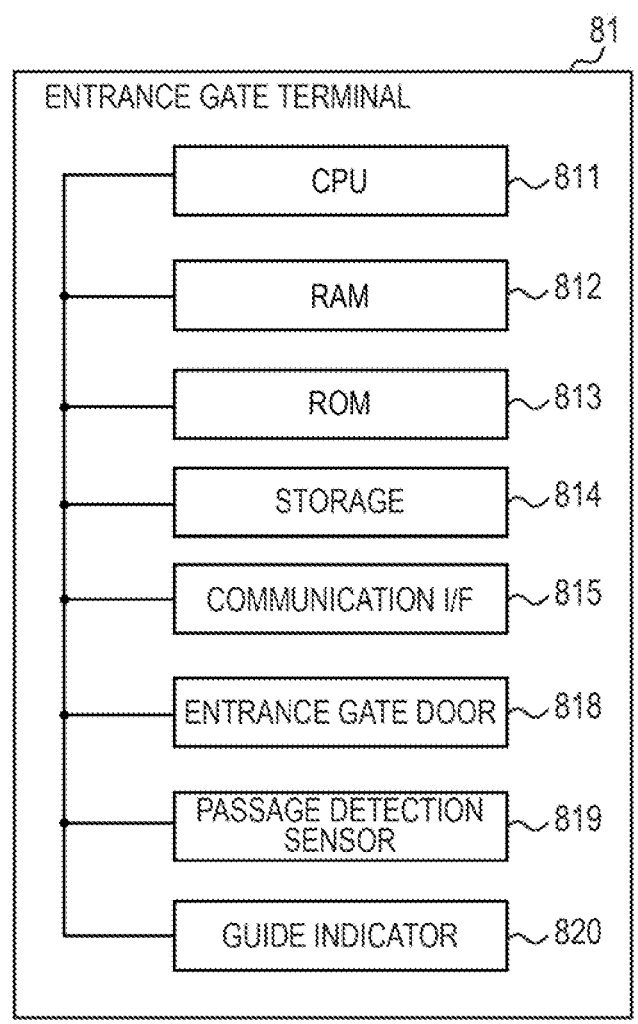
FIG. 24 is a block diagram showing an example of a hardware configuration of the entrance gate terminal according to the third embodiment.
Figure 25:
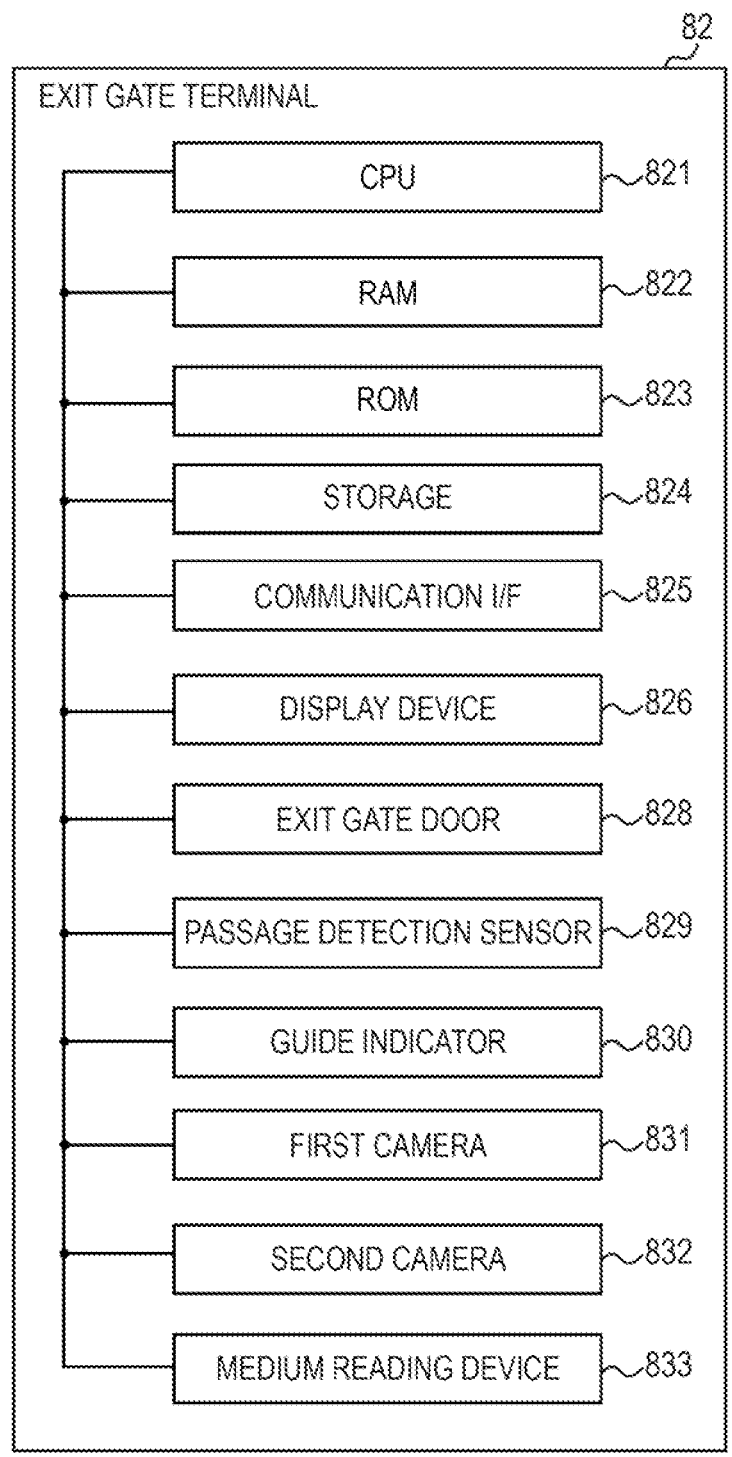
FIG. 25 is a block diagram showing an example of a hardware configuration of an exit gate terminal according to the third embodiment.

FIG. 23 is a schematic diagram showing an appearance of an entrance gate terminal 81 and an exit gate terminal 82 constituting the automatic customs gate apparatus 80. FIG. 24 is a block diagram showing an example of a hardware configuration of the entrance gate terminal 81. FIG. 25 is a block diagram showing an example of a hardware configuration of the exit gate terminal 82.

The automatic customs gate apparatus 80 is an electronic gate that allows or restricts passage based on such as a result of face matching. A user U who is allowed to pass through the gate can exit the customs inspection area and enter the second country. A users U who is not allowed to pass through the gate are dealt with individually. For example, the user U is subjected to a face-to-face customs inspection by a staff at a manned booth.

As shown in FIG. 23, the entrance gate terminal 81 and the exit gate terminal 82 constituting the automatic customs gate apparatus 80 are installed at the entrance and exit of the gate passage P through which the user U is to pass, respectively. In the gate passage P, for example, partition plates, walls, fences, inspection tables, or the like are installed on both sides along the gate passage P. Such as the partition plates restrict the the user U who enters the gate passage P to exit from an exit gate terminal other than the exit gate terminal 82.

As shown in FIG. 23, the entrance gate terminal 81 is a gate device installed at the entrance of the gate passage P through which the user U passes. As shown in FIG. 24, the entrance gate terminal 81 includes a CPU 811, a RAM 812, a ROM 813, a storage 814, a communication I/F 815, an entrance gate door 818, a passage detection sensor 819, and a guide indicator 820. Respective devices are connected to each other via a bus, a wiring, a drive device, or the like.

The entrance gate doors 818 are open/close doors that perform an opening operation and a closing operation under the control of the CPU 811 and transition between an opened state to permit passage of the user and a closed state to block passage of the user. The opening and closing scheme of the entrance gate doors 818 is not particularly limited and may be, for example, a flapper type, a slide type, a revolving type, or the like.

In response to detecting passage of the user, each the passage detection sensor 819 outputs an output signal indicating the passage of the user U. The CPU 811 can determine whether or not the user U has passed through the entrance gate terminal 81 and entered the gate passage P based on the output signals from the plurality of the passage detection sensors 819 and the output order of the output signals. The gate passage P is an area between the entrance gate terminal 81 and the exit gate terminal 82.

The guide indicator 820 displays an indication indicating whether to permit entry the gate passage P under the control of the CPU 811. When the entrance gate doors 818 are in an opened state, the guide indicator 820 displays an indication indicating that entry to the gate passage P is permitted. Further, when the entrance gate doors 818 are in a closed state, the guide indicator 820 displays an indication indicating that entry to the gate passage P is prohibited. The guide indicator 820 can display an indication indicating whether to permit entry to the gate passage P by using a color indication, a symbol indication, a text indication, or the like, for example.

As shown in FIG. 25, the exit gate terminal 82 includes a CPU 821, a RAM 822, a ROM 823, a storage 824, a communication I/F 825, a display device 826, an exit gate door 828, a passage detection sensor 829, a guide display 830, a first camera 831, a second camera 832, and a medium reading device 833. Respective devices are connected to each other via a bus, a wiring, a drive device, or the like.

The exit gate doors 828 are open/close doors that performs an opening operation and a closing operation under the control of the CPU and transitions between a closed state to block passage of the user U and an opened state to permit passage of the user U.

The first camera 831 is a long-range camera that has a capturable range in at least the inside of the gate passage P and can capture a more distant location than the second camera 832. The second camera 832 is a short-range camera that has a capturable range in at least a front area of the exit gate terminal 82. Note that the locations where the first camera 831 and the second camera 832 are provided are not particularly limited and may be any location that can realize respective capturable ranges.

The medium reading device 833 reads the tag information from the baggage tag attached to the baggage carried by the user U. Examples of the medium reading device 833 include a contactless integrated circuit (IC) reader, a code reader, and an optical character reader (OCR) device. In the present example embodiment, the baggage tag BT shown in FIG. 23 is an RFID tag, and the medium reading device 833 is an RFID tag reader.

Figure 26:
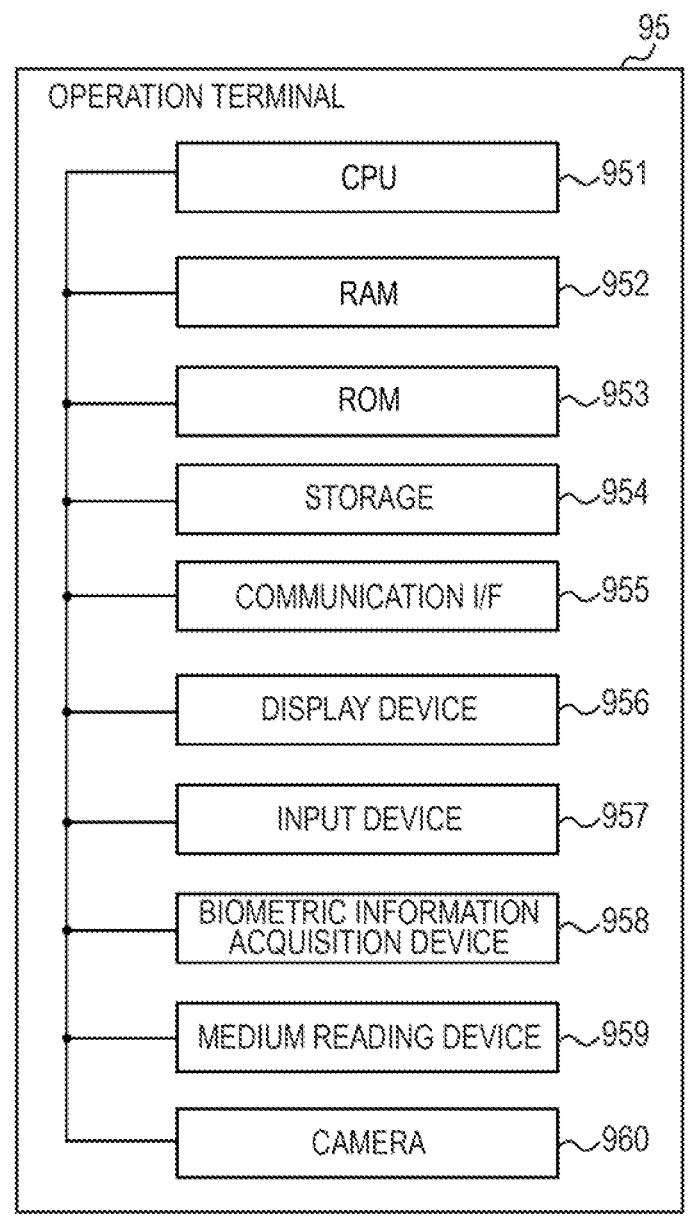
FIG. 26 is a block diagram showing an example of a hardware configuration of an operation terminal according to the third embodiment.

FIG. 26 is a block diagram showing an example of a hardware configuration of the operation terminal 95. The operation terminal 95 includes a CPU 951, a RAM 952, a ROM 953, a storage 954, a communication I/F 955, a display device 956, an input device 957, a biometric information acquisition device 958, a medium reading device 959, and a camera 960 as computers for performing operations, control, and storage. The camera 960 is a digital camera having, for example, a complementary metal-oxide-semiconductor (CMOS) image sensor, a charge coupled device (CCD) image sensor or the like as light receiving elements. The camera 960 in the present example embodiment captures the baggage carried by the user and generates an image of the baggage. Respective devices are connected to each other via a bus, a wiring, a drive device, or the like.

Figure 27:
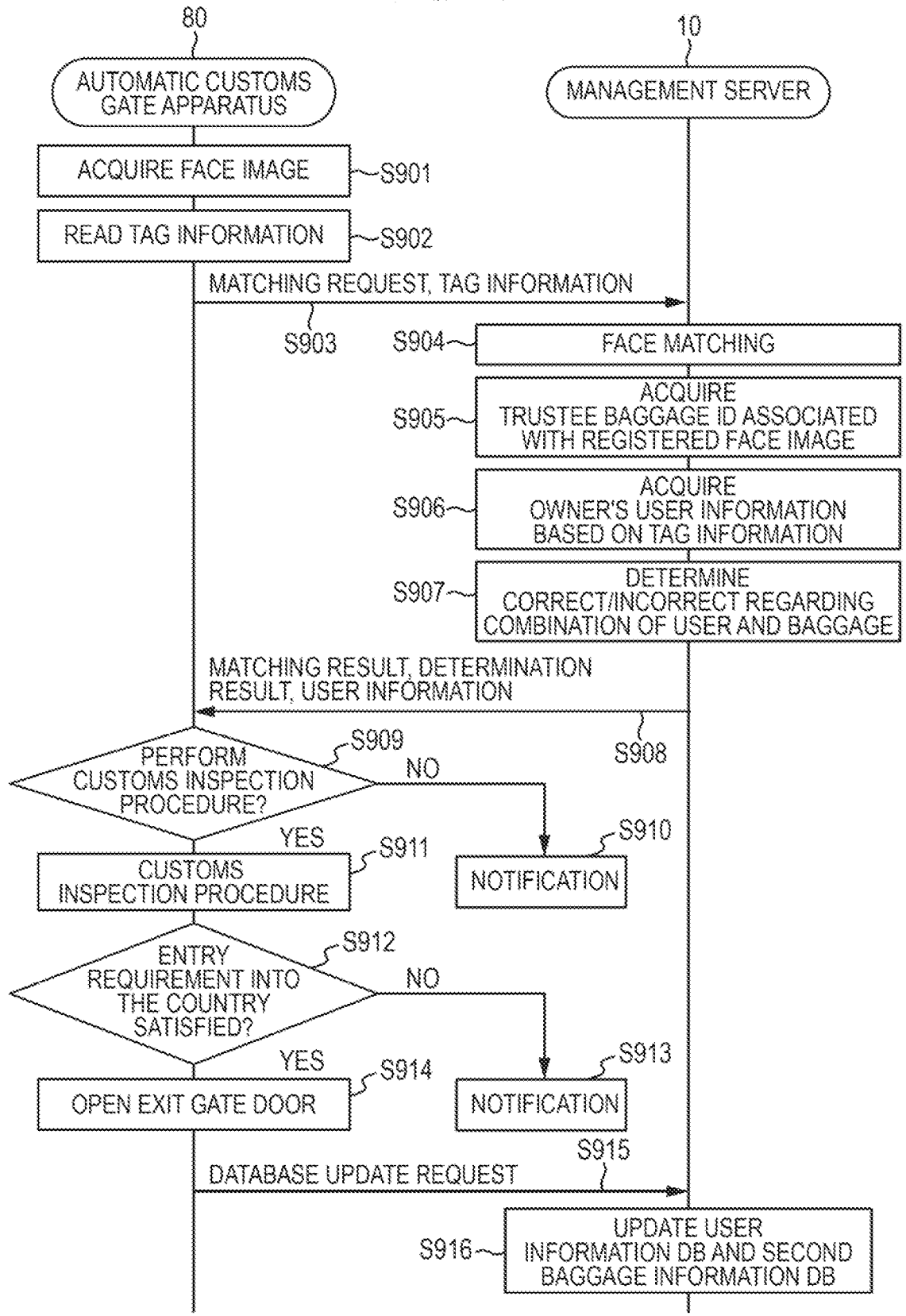
FIG. 27 is a sequence chart showing an example of a process in a customs inspection procedure of the information processing system according to the third embodiment.

FIG. 27 is a sequence chart showing an example of a process in the information processing system. This process is performed when a user who has completed the entry inspection procedure undergoes the customs inspection procedure. The following describes a process when the user is in the gate passage P between the entrance gate door 818 (entrance gate terminal 81) and the exit gate door 828 (exit gate terminal 82) of the automatic customs gate apparatus 80.

First, when the automatic customs gate apparatus 80 detects the face of the user by the first camera 831 and the second camera 832, the automatic customs gate apparatus 80 captures a face image of the user (step S901).

Next, the automatic customs gate apparatus 80 reads the tag information from the baggage tag attached to the baggage carried by the user using the medium reading device 833 (step S902).

Next, the automatic customs gate apparatus 80 transmits a matching request including the face image of the user (target face image) and tag information to the management server 10 (step S903). In this way, the automatic customs gate apparatus 80 requests the management server 10 to perform a one-to-N matching between the target face image of the user and a plurality of registered face images registered in the user information DB 11 of the management server 10.

Upon receiving the matching request from the automatic customs gate apparatus 80, the management server 10 performs the one-to N face matching between the target face image of the user and the registered face image (step S904). When the matching result is a successful matching, the management server 10 acquires user information associated with the registered face image from the user information DB 11 (step S905). The user information includes the user ID and the trustee baggage ID of the trustee baggage actually deposited by the user.

Next, the management server 10 acquires user information from the user information DB 11 using the trustee baggage ID included in the received tag information as a key (step S906). This user information includes the user ID of the person who deposited the trustee baggage, i.e., the owner of the trustee baggage.

Next, the management server 10 compares the combination of the user and the trustee baggage specified in step S905 with the combination of the owner and the trustee baggage specified in step S906 and determines whether or not the combination of the user and the baggage carried by the user is correct (step S907).

Specifically, when the user is the same person as the registrant and the trustee baggage ID of the baggage carried by the user is the same as the trustee baggage ID associated with the registrant, the management server 10 determines that the combination of the user and the baggage is correct. On the other hand, when the user is authenticated as the same person as the registrant and the trustee baggage ID of the baggage carried by the user is not the same as the trustee baggage ID associated with the registrant, the management server 10 determines that the combination of the user and the baggage is incorrect. Note that, when the user could not be authenticated in step S904, the user information could not be acquired. Therefore, in this case, the process of step S906 is omitted. In addition, the process of steps S906 to S907 may be replaced by a process to determine whether or not the trustee baggage ID acquired in step S905 is the same as the trustee baggage ID included in the tag information.

Next, the management server 10 transmits the matching result in step S904, the user information, and the determination result in step S906 to the automatic customs gate apparatus 80 (step S908).

Upon receiving the matching result and the determination result from the management server 10, the automatic customs gate apparatus 80 determines whether or not the customs inspection procedure of the user can be performed (step S909). Specifically, a condition for performing the customs inspection procedure is that the user is certified as the same person as the registrant and that the combination of the user and the baggage carried by the user is correct.

When the automatic customs gate apparatus 80 determined that the customs inspection procedure of the user can not be performed (step S909: NO), the automatic customs gate apparatus 80 notifies the user of an error message (step S910) and the process ends. The error messages differ between errors related to identity verification and those related to baggage carried by the user.

On the other hand, when the automatic customs gate apparatus 80 determines that the customs inspection procedure of the user can be performed (step S909: YES), the process proceeds to step S911.

In step S911, the automatic customs gate apparatus 80 performs the customs inspection procedure of the user based on the user information.

Next, the automatic customs gate apparatus 80 determines whether or not the user satisfies the predetermined entry requirements into the country (step S912). When the automatic customs gate apparatus 80 determines that the user does not satisfy the predetermined entry requirements into the country (step S912: NO), the automatic customs gate apparatus 80 notifies the user of an error message such as "Please undergo customs inspection procedure at a manned counter." (step S913) and the process ends.

On the other hand, when the automatic customs gate apparatus 80 determines that the user satisfies the predetermined entry requirements into the country (step S912: YES), the automatic customs gate apparatus 80 opens the exit gate door 828 (step S914). In this way, the user is allowed to enter the second country.

Next, the automatic customs gate apparatus 80 transmits a database update request to the management server 10 (step S915). Data of the update request includes, for example, the user ID and the trustee baggage ID.

When the management server 10 receives the update request from the automatic customs gate apparatus 80, the management server 10 updates the status in the user information DB 11 and the second baggage information DB 13 (step S916) and the process ends.

Figure 28:
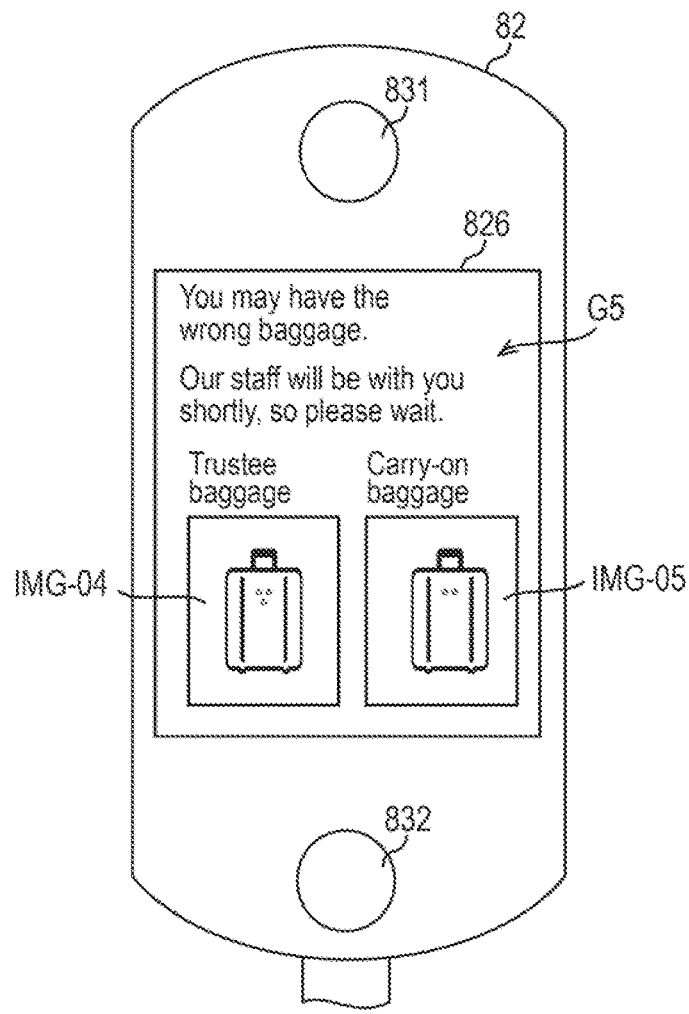
FIG. 28 is a diagram showing an example of a screen displayed on the automatic customs gate apparatus according to the third embodiment.

FIG. 28 is a diagram showing an example of the screen displayed on the exit gate terminal 82. Here, the display device 826 displays a message G5 for guidance to the user regarding the mix-up of baggage, an image IMG-04 of a baggage deposited by the user at the time of departure, and an image IMG-05 of a baggage carried by the user at the time of customs inspection. The message G5 is as follows. "You may have the wrong baggage. Our staff will be with you shortly, so please wait."

The process shown in FIG. 27 is not limited to the automatic customs gate apparatus 80, but can also be performed on the operation terminal 95 used by a staff at the customs inspection site. In this case, the term "automatic customs gate apparatus" in the explanation of FIG. 27 may be replaced with "operation terminal".

Figure 29:
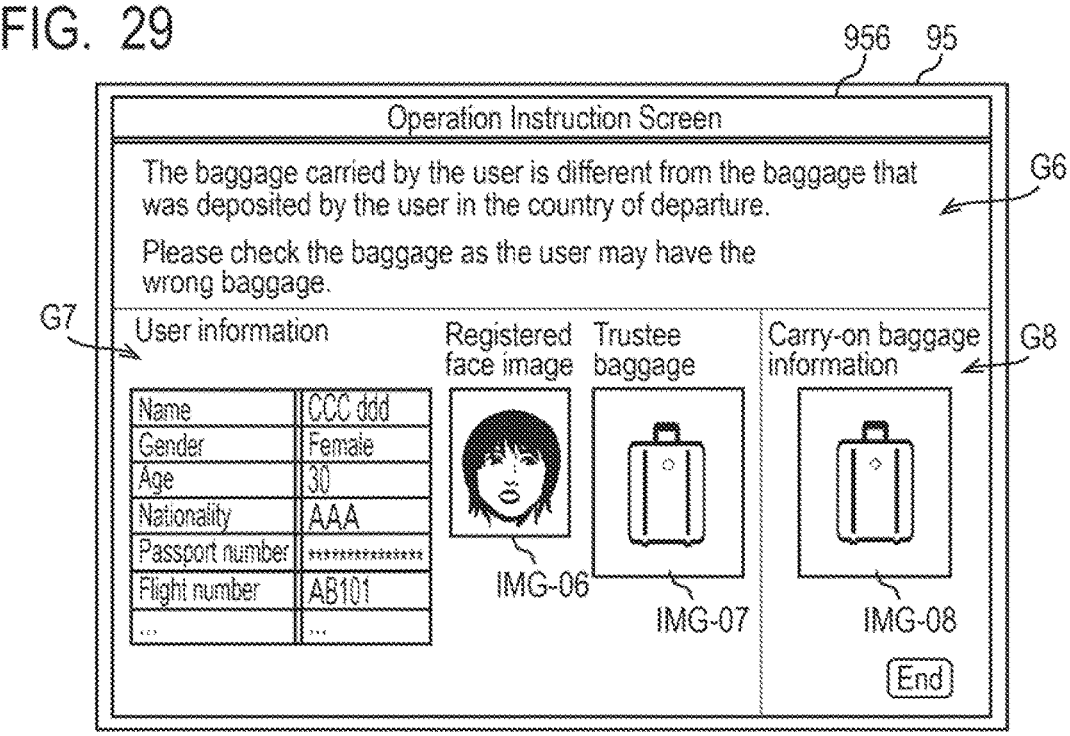
FIG. 29 is a diagram showing an example of a screen displayed on the operation terminal according to the third embodiment.

FIG. 29 is a diagram showing an example of a screen displayed on the operation terminal 95. Here, the display device 956 displays a message G6 urging the staff to check the baggage, user information G7, and baggage information G8 are displayed on. The message G6 is as follows. "The baggage carried by the user is different from the baggage that was deposited by the user in the country of departure. Please check the baggage as the user may have the wrong baggage." The baggage information G8 includes, a registered face image IMG-06 of the user, an image IMG-07 of a baggage deposited by the user at the time of departure, and an image IMG-08 of a baggage carried by the user at the time of customs inspection.

According to the present example embodiment, even if the user mistakenly picks up another person's baggage in the baggage claim, it can be reliably detected at the customs inspection site. Since the owner of the baggage carried by the user can also be specified, the user (owner) can be sure to pick up the trustee baggage.

Fourth Example Embodiment

In the third embodiment described above, the correct or incorrect combination of the user and the baggage carried by the user is determined based on the tag information. On the other hand, the present example embodiment differs from the third embodiment in that the correct or incorrect combination of the user and the baggage is determined by matching the baggage image at the time of depositing with the baggage image at the time of inspection.

Figure 30:
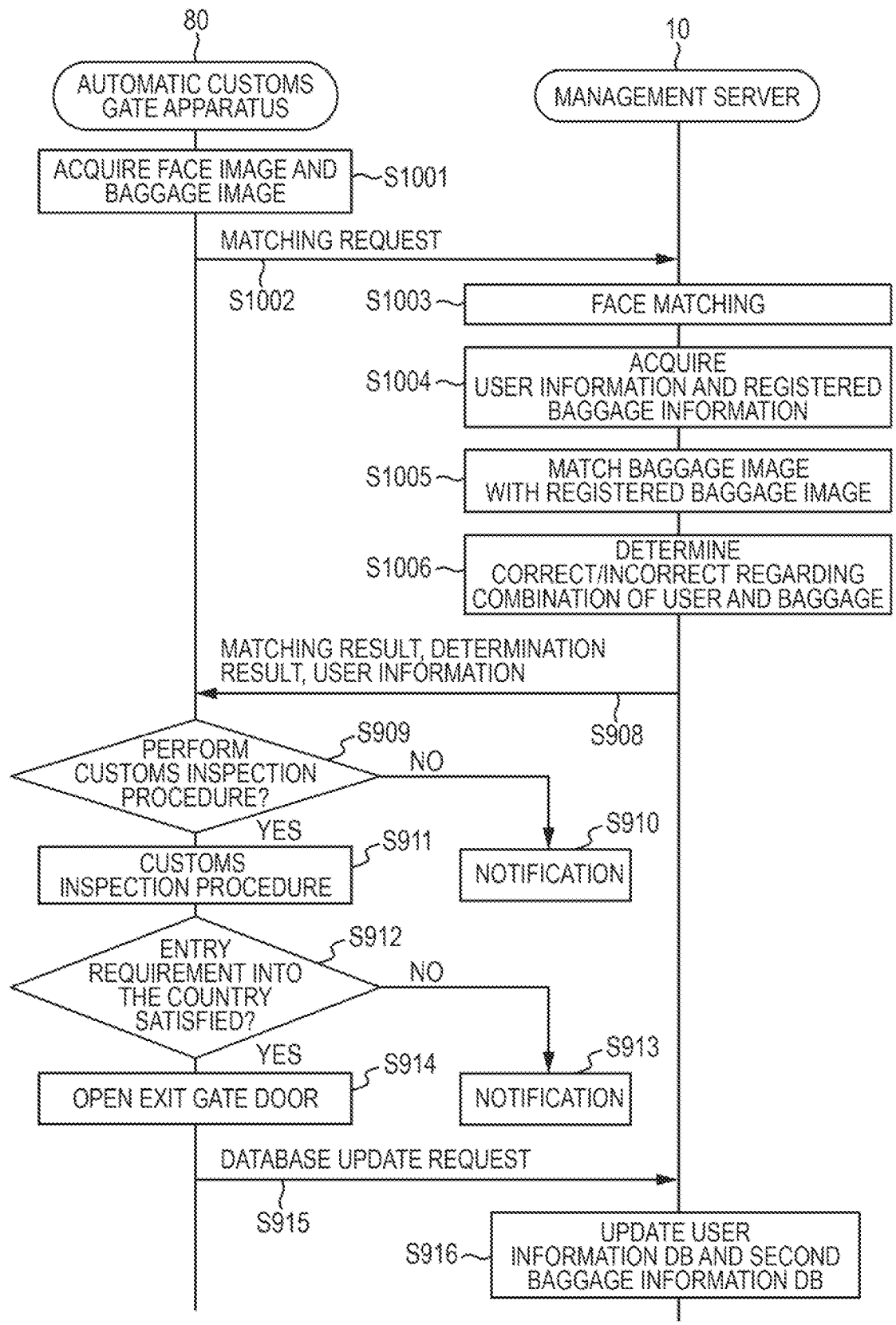
FIG. 30 is a sequence chart showing an example of a process in the customs inspection procedure of the information processing system according to a fourth embodiment.

FIG. 30 is a sequence chart showing an example of a process in the customs inspection procedure of the information processing system according to the present example embodiment. This process is different for steps S1001 to S1006 from FIG. 27 and is common for step S908 onward. For this reason, the differences are explained below.

In step S1001, the automatic customs gate apparatus 80 acquires a face image of a user and a baggage image of a baggage carried by the user.

In step S1002, the automatic customs gate apparatus 80 transmits a matching request including the face image and the baggage image to the management server 10.

In step S1003, upon receiving the matching request from the automatic customs gate apparatus 80, the management server 10 performs a one-to-N face matching between the target face image of the user and a registered face image.

In step S1004, when the matching result is a successful matching, the management server 10 acquires user information associated with the registered face image from the user information DB 11. Moreover, the management server 10 acquires the registered baggage image from the second baggage information DB 13 using a trustee baggage ID included in the user information as a key.

In step S1005, the management server 10 performs a image matching between the baggage image captured at the customs inspection site and the registered baggage image registered in the first country.

In step S1006, the management server 10 determines whether or not the combination of the user and the baggage carried by the user is correct based on the result of the face matching in step S1003 and the result of the image matching in step S1005. Then, the process proceeds to step S908.

Specifically, when the user is the same person as the registrant and the baggage image of the baggage carried by the user matches the registered baggage image of the trustee baggage associated with the registrant, the management server 10 determines that the combination of the user and the baggage is correct. On the other hand, when the user is authenticated as the same person as the registrant and the baggage image of the baggage carried by the user does not match the registered baggage image of the baggage associated with the registrant, the management server 10 determines that the combination of the user and the baggage is incorrect. Note that, when the user could not be authenticated in step S1003, the registered baggage image could not be acquired from the second baggage information DB 13 using the trustee baggage ID included in the user information as a key. Therefore, in this case, the processing in step S1006 is omitted.

According to the present example embodiment, the captured baggage image of the baggage carried by the user at the customs inspection site (touch point TP7) of the second country is matched with the image of the registered baggage deposited by the user at the baggage check-in point (touch point TP2) of the first country. Thus, in addition to the same effect as in the third embodiment, it is not necessary to attach the baggage tag to the baggage, and the owner of the baggage can be identified even if the baggage tag is broken or lost during the conveyance of the baggage.

Fifth Example Embodiment

In the third and fourth embodiment described above, the case of automatically determining the correct or incorrect combination of the user and the baggage carried by the user was explained. On the other hand, the present example embodiment differs from the third and fourth embodiments in that the combination of the user and the baggage deposited at the first country by the user, that is, the correct combination of the user and the baggage, is displayed on the operation terminal 95 to assist the staff in the confirmation work.

Figure 31:
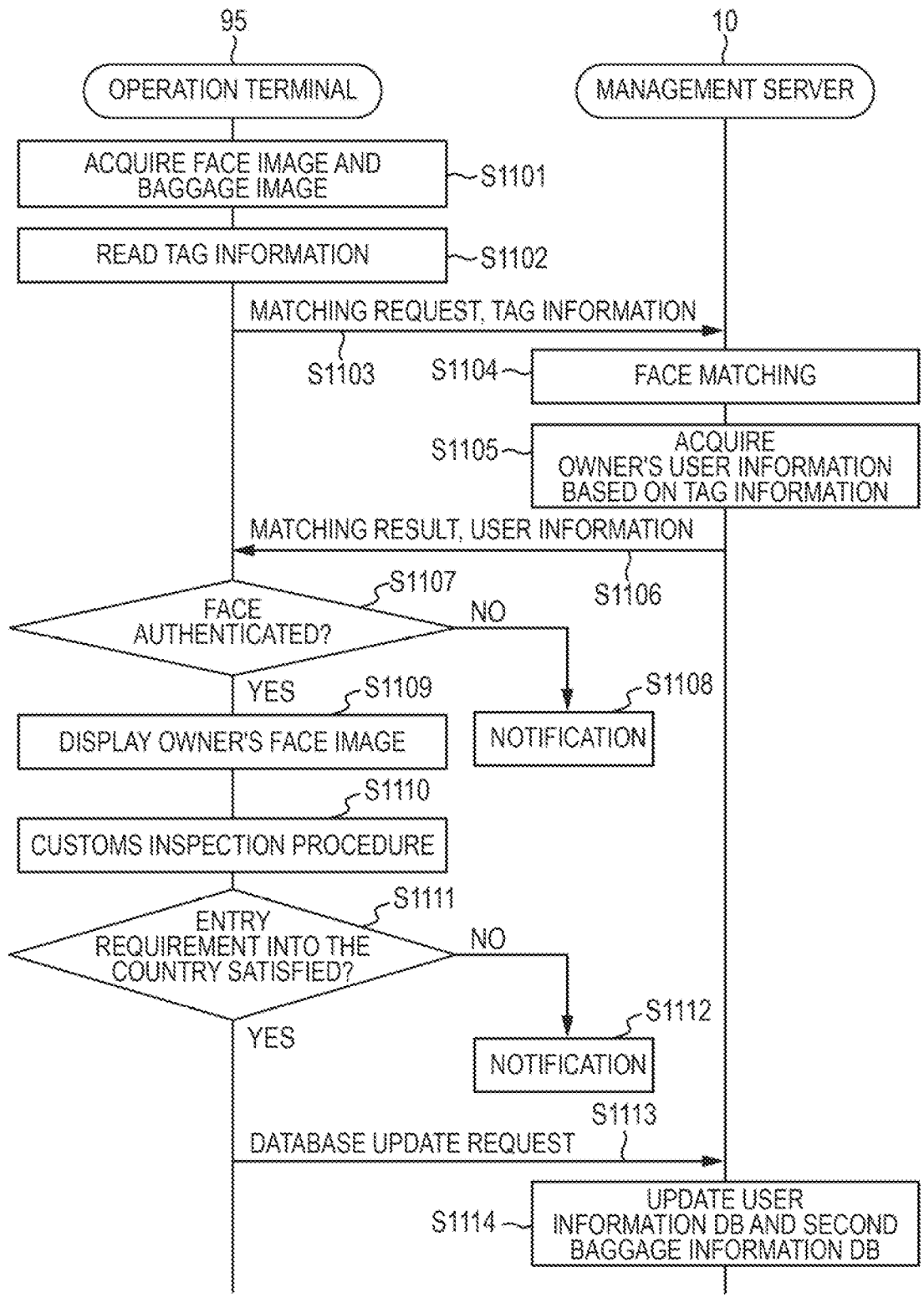
FIG. 31 is a sequence chart showing an example of a process in the customs inspection procedure of the information processing system according to a fifth embodiment.

FIG. 31 is a sequence chart showing an example of a process in the customs inspection procedure of the information processing system according to the present example embodiment.

First, the operation terminal 95 captures a face image fo the user with the biometric information acquisition device 958, and captures a baggage image of a baggage carried by the user with the camera 960 (step S1101).

Next, the operation terminal 95 reads the tag information from the baggage tag attached to the baggage carried by the user using the medium reading device 959 (step S1102).

Next, the operation terminal 95 transmits a matching request including a face image (target face image) of the user and tag information to the management server 10 (step S1103). Accordingly, the operation terminal 95 requests the management server 10 to perform a one-to-N matching between the target face image of the user and a plurality of registered face images registered in the user information DB 11 of the management server 10.

Upon receiving the matching request from the operation terminal 95, the management server 10 perform the one-to-N matching between the target face image of the user and the registered face image (step S1104). When the matching result is a successful matching, the management server 10 extracts the user information associated with the registered face image from the user information DB 11. The user information includes the user ID and the trustee baggage ID of the trustee baggage actually deposited by the user.

Next, the management server 10 acquires user information from the user information DB 11 using the trustee baggage ID included in the received tag information as a key (step S1105). This user information includes the user ID of the person who deposited the trustee baggage, i.e., the owner of the trustee baggage.

Next, the management server 10 transmits a matching result in step S1104 and the user information to the operation terminal 95 (step S1106).

Upon receiving the matching result from the management server 10, the operation terminal 95 determines whether or not a face authentication related to the user has succeeded (step S1107).

When the operation terminal 95 determines that the face authentication related to the user has not succeeded (step S1107: NO), the operation terminal 95 notifies the user of an error message (step S1108) and the process ends.

On the other hand, when the operation terminal 95 determines that the face authentication related to the user has succeeded (step S1107: YES), the process proceeds to step S1109.

In step S1109, the operation terminal 95 displays the registered face image included in the user information received from the management server 10 on the display device 956. The operation terminal 95 displays the face image of the owner of the baggage carried by the user. In this way, the operation terminal 95 makes a staff determine whether or not the user who undergoes the customs inspection procedure is the same person as the owner of the baggage. When the staff determines that the user is the same person as the owner and that the combination of the user and the baggage carried by the user is correct, the process proceeds to step S1110.

Next, the operation terminal 95 performs the customs inspection procedure on the user based on the user information (step S1110).

Next, the operation terminal 95 determines whether or not the user satisfies the predetermined entry requirements into the country (step S1111). When the operation terminal 95 determines that the user does not satisfy the predetermined entry requirements into the country (step S1111: NO), the operation terminal 95 notifies the staff of an error message such as "The entry requirements into the country are not satisfied" (step S1112) and the process ends.

On the other hand, when the operation terminal 95 determines that the user satisfies the predetermined entry requirements into the country (step S1111: YES), the user can enter the second country.

Next, the operation terminal 95 transmits a database update request to the management server 10 (step S1113). Data of the update request includes, for example, a user ID and a trustee baggage ID.

Upon receiving the update request from the operation terminal 95, the management server 10 updates the status in the user information DB 11 and the second baggage information DB 13 (step S1114) and the process ends.

Figure 32:
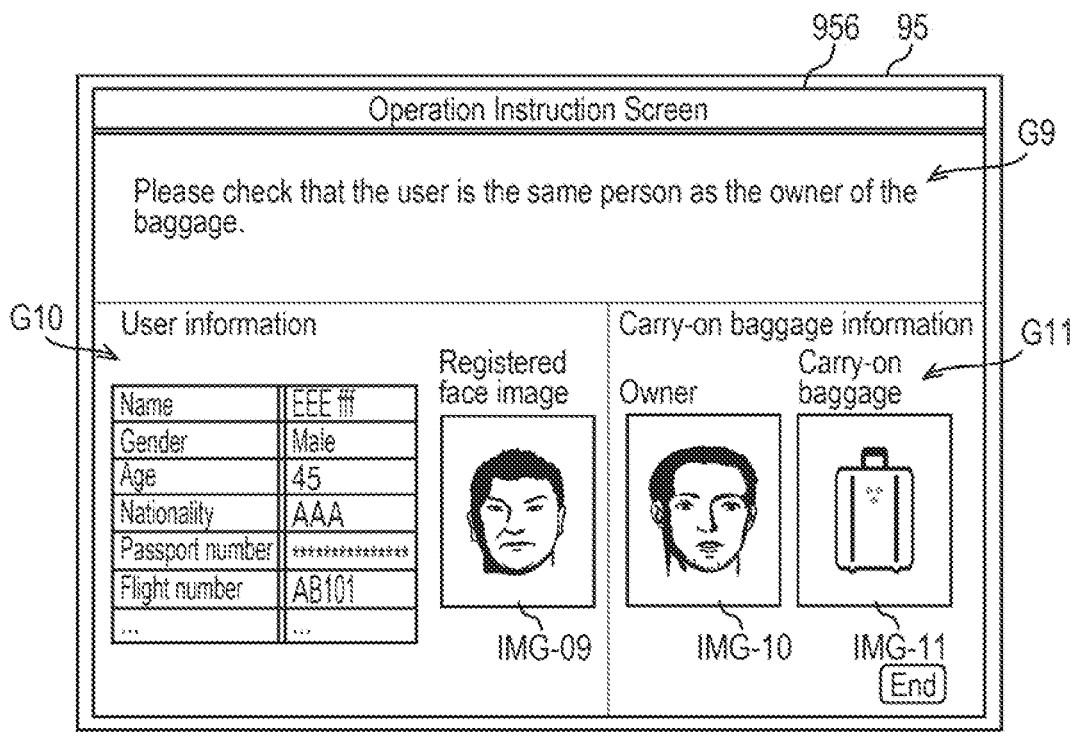
FIG. 32 is a diagram showing an example of a screen displayed on the operation terminal according to the fifth embodiment.

FIG. 32 is a diagram showing an example of the screen displayed on the operation terminal 95. The display device 956 displays a message G9 urging the a staff to check the baggage, user information G10, and carry-on baggage information G11. The message G9 is as follows. "Please check that the user is the same person as the owner of the baggage." The user information G10 includes a registered face image IMG-09 of a user who undergoes the customs inspection procedure. On the other hand, the carry-on baggage information G11 includes a face image IMG-10 of the owner of the baggage carried by the user, and an image IMG-11 of the baggage carried by the user at the customs inspection procedure.

According to the present example embodiment, by displaying the face image of the owner of the baggage on the operation terminal 95, it is possible to efficiently support the confirmation work of the staff regarding the correct or incorrect combination of the user and the baggage carried by the user.

Sixth Example Embodiment

In the fifth embodiment described above, the face image of the owner of the baggage is acquired based on the tag information, and the face image is displayed on the screen for the staff. On the other hand, the present example embodiment differs from the fifth embodiment in that, based on the result of face matching between the face image of the user captured at the customs inspection site and the registered face image, the user acquires the baggage image of the baggage actually deposited at the first country and displays the baggage image on the screen for the staff.

Figure 33:
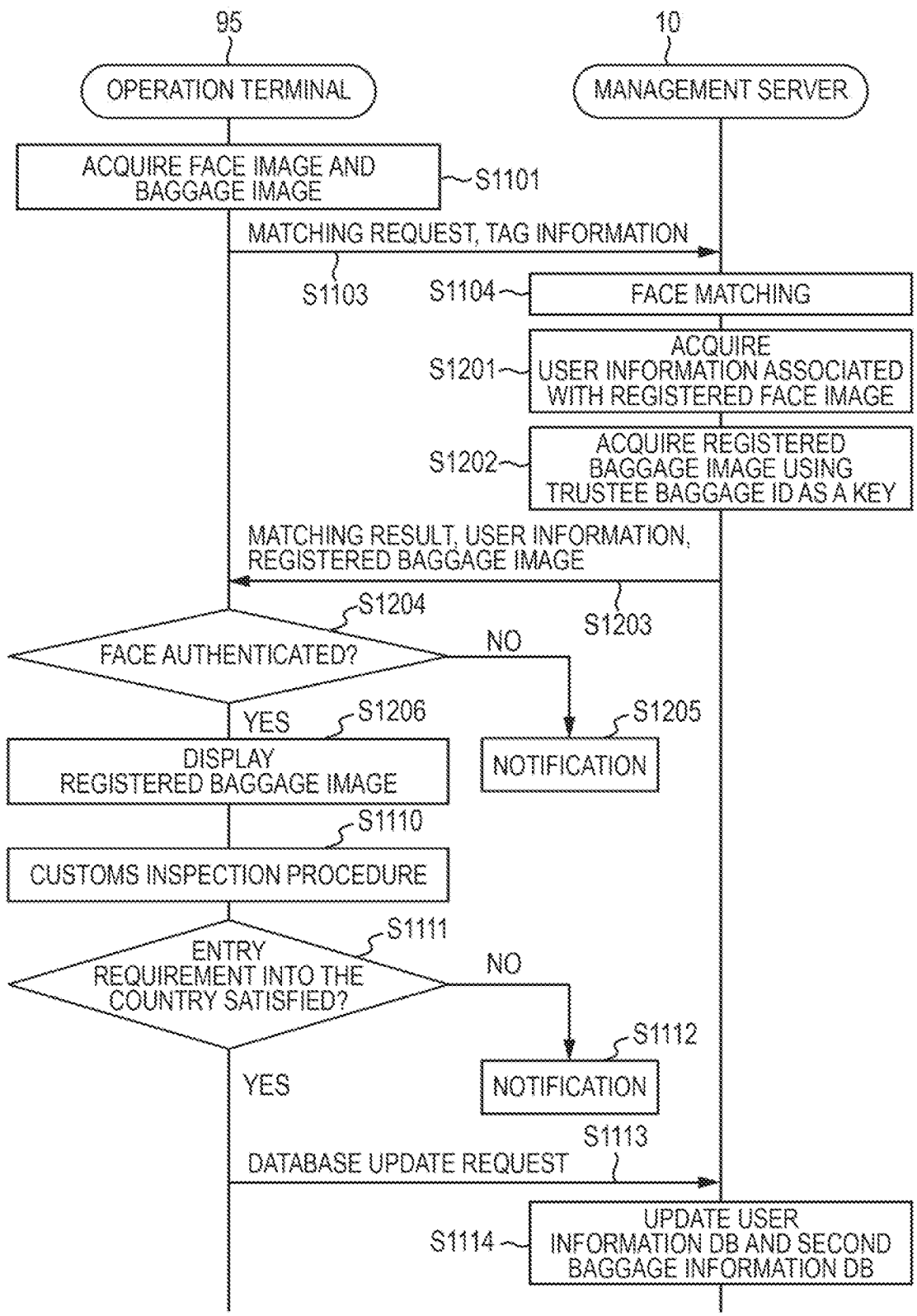
FIG. 33 is a sequence chart showing an example of a process in the customs inspection procedure of the information processing system according to a sixth embodiment.

FIG. 33 is a sequence chart showing an example of a process in the customs inspection procedure of the information processing system according to the present example embodiment. This process is the same as that in FIG. 31 except for steps S1201 to S1206. For this reason, the differences are explained below.

In step S1201, the management server 10 acquires user information associated with the registered face image from the user information DB 11 when the matching result of the face matching in step S1104 is a successful matching. The user information includes the user ID and the trustee baggage ID of the trustee baggage actually deposited by the user.

In step S1202, the management server 10 acquires a registered baggage image from the second baggage information DB 13 using the trustee baggage ID included in the received tag information as a key.

In step S1203, the management server 10 transmits the matching result, user information, and the registered baggage image to the operation terminal 95.

In step S1204, upon receiving the matching result from the management server 10, the operation terminal 95 determines whether or not a face authentication related to the user has succeeded.

When the operation terminal 95 determines that the face authentication related to the user has failed (step S1204: NO), the operation terminal 95 notifies the user of an error message (step S1205) and the process ends.

On the other hand, when the operation terminal 95 determines that the face authentication related to the user has succeeded (step S1204: YES), the process proceeds to step S1206.

In step S1206, the operation terminal 95 displays the registered baggage image received from the management server 10 on the display device 956. The operation terminal 95 may further display the baggage image acquired in step S1101 on the display device 956 as a comparison target with the registered baggage image. By displaying the registered baggage image of the baggage actually deposited by the user in the first country, the operation terminal 95 allows the staff to determine whether or not the baggage deposited by the user in the first country is the same as the baggage carried by the user in the second country. when the staff determines that the baggage is the same as the trustee baggage and that the combination of the user and the baggage carried by the user is correct, the process proceeds to step S1110.

Figure 34:
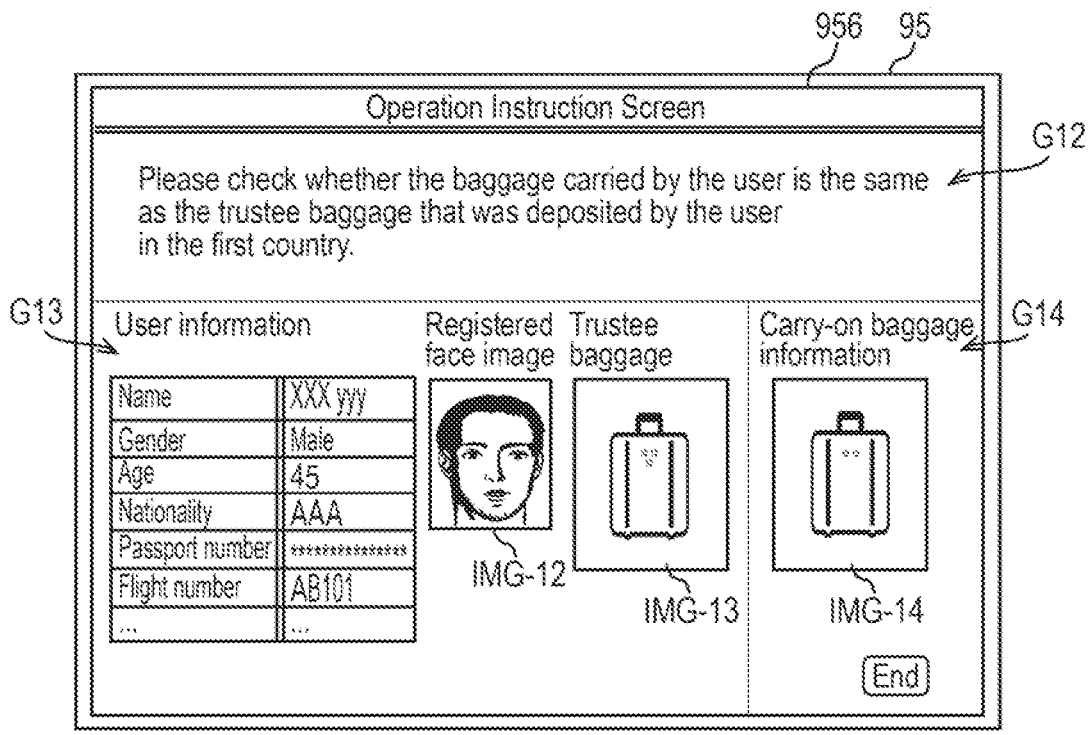
FIG. 34 is a diagram showing an example of a screen displayed on the operation terminal according to the sixth embodiment.

FIG. 34 is a diagram showing an example of the screen displayed on the operation terminal 95. The display device 956 displays a message G12, user information G13, and carry-on baggage information G14 urging the staff to check the baggage. The message G12 is as follows. "Please check whether the baggage carried by the user is the same as the trustee baggage that was deposited by the user in the first country." The user information G13 includes a registered face image IMG-12 of a user who undergoes the customs inspection procedure, and an image IMG-13 of a trustee baggage deposited at the first country. On the other hand, the carry-on baggage information G14 includes an image IMG-14 of the baggage carried by the user at the customs inspection procedure.

According to the present example embodiment, by displaying on the operation terminal 95 the image of the baggage actually deposited at the first country by the user who is undergoing the customs inspection procedure, it is possible to efficiently support the staff in the confirmation work related to the correct or incorrect combination of the user and the baggage carried by the user.

Seventh Example Embodiment

Figure 35:
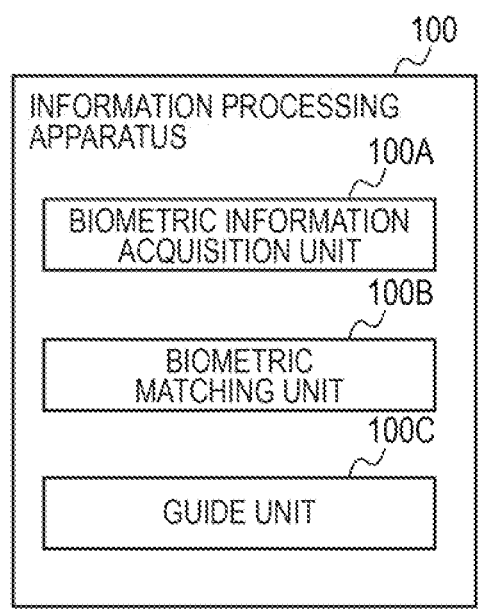
FIG. 35 is a functional block diagram of an information processing apparatus according to a seventh embodiment.

FIG. 35 is a functional block diagram of the information processing apparatus according to the present example embodiment. The information processing apparatus 100 includes a biometric information acquisition unit 100A, a biometric matching unit 100B, and a guide unit 100C. The biometric information acquisition unit 100A acquires biometric information of a user at an arrival airport. The biometric matching unit 100B performs a matching process of the biometric information with registered biometric information of a registrant who deposited a baggage with the airline at a departure airport. The guide unit 100C outputs guide information including a location of pickup in the arrival airport and a start time of pickup of the baggage associated with the registered biometric information to the user who is authenticated as the same person as the registrant by the matching process.

According to the present example embodiment, an information processing apparatus 100 is provided which enables users to efficiently pick up their baggage at the arrival airport.

Modified Example Embodiments

Although the disclosure has been described above with reference to the example embodiments, the disclosure is not limited to the example embodiments described above. Various modifications that may be understood by those skilled in the art can be made to the configuration and details of the disclosure within the scope not departing from the spirit of the disclosure. For example, it should be understood that an example embodiment in which a part of the configuration of any of the example embodiments is added to another example embodiment or an example embodiment in which a part of the configuration of any of the example embodiments is replaced with a part of another example embodiment is also one of the example embodiments to which the disclosure may be applied.

In the first and second example embodiment described above, the notification destination (output destination) of the guide information is limited to the signage terminal 90 installed at the airport, but the notification destination is not limited to this. By associating the contact information of a user terminal carried by the user with the boarding reservation information of the user, the guide information may be notified to the user terminal.

For example, when a user stands in front of the signage terminal 90 and the user is identified as the same person as the registrant by face authentication, the guide information may be transmitted by such as an e-mail to the contact information of the mobile terminal (user terminal) associated with the user ID.

In addition, in the first and second example embodiment described above, it is described that the guide information related to the pickup of the trustee baggage is provided by printing it on the paper medium or by displaying on the screen (See FIG. 16, FIG. 22). However, the method to provide the guide information is not limited to these. For example, the signage terminal 90 may provide the guide information to the user by displaying a code such as a two-dimensional code recording guide information. In this case, the user can easily capture the code using a smartphone to store the guide information in the smartphone.

It is also preferable to configure the system so that the display language of the guide information can be switched for each user. For example, by including attribute information related to the native language of the user in the user information of the user who is identified by face authentication, the guide information including the location and start time of pickup can be displayed in the native language of the user, thereby, the convenience can be improved.

In the fourth embodiment described above, it is described that the management server 10 matches the baggage image of the baggage carried by the user with the registered baggage image registered in advance in the second baggage information DB 13 related to the user after the matching process of the face image. However, the order of the face image matching process and the baggage image matching process may be reversed. Specifically, the management server 10 performs the one-to-N matching between the baggage image and the registered baggage image registered in the second baggage information DB 13 and specifies the trustee baggage ID of a baggage matched with the baggage image. Next, the management server 10 acquires the registered face image of the owner from the user information DB 11 using the trustee baggage ID as a key. Then, the management server 10 performs a one-to-one matching between the face image of the user and the registered face image of the owner. Thus, as in the case of the fourth embodiment, the correct or incorrect combination of the user and the baggage can be automatically determined.

In the above sixth embodiment, the image of the trustee baggage deposited by the user in the first country is displayed on the operation terminal 95, but instead of the image or together with the image, information indicating the appearance features such as color, size and shape of the trustee baggage may be displayed.

In the fifth embodiment described above, it is described that the operation terminal 95 displays the registered face image of the registrant (owner) associated with the trustee baggage ID included in the read tag information and makes the staff determine whether or not the user is the same person as the owner of the baggage. However, as in the fourth embodiment, it may be configured to acquire the baggage image of the baggage carried by the user. In this case, the management server 10 can acquire the face image of the owner and output the face image to the operation terminal 95 by image matching between the baggage image acquired from the operation terminal 95 and the registered baggage image registered in the second baggage information DB 13.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the individual program itself.

As the storage medium, for example, a floppy (registered trademark) disk, a hard disk, an optical disk, a magneto-optical disk, a CD-ROM, a magnetic tape, a nonvolatile memory card, or the like can be used. Further, the scope of each of the example embodiments also includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

Supplementary Note 1

An information processing apparatus comprising:
a biometric information acquisition unit that acquires biometric information of a user at an arrival airport;
a biometric matching unit that performs a matching process of the biometric information with registered biometric information of a registrant who deposited a baggage with the airline at a departure airport; and
a guide unit that outputs guide information including a location of pickup in the arrival airport and a start time of pickup of the baggage associated with the registered biometric information to the user who is authenticated as the same person as the registrant by the matching process.

Supplementary Note 2

The information processing apparatus according to supplementary note 1, further comprising:
a specifying unit that specifies a location of the baggage based on information acquired by an equipment that is installed on a conveyance route of the baggage in the arrival airport.

Supplementary Note 3

The information processing apparatus according to supplementary note 2, further comprising:
a tag information acquisition unit that acquires tag information read by the equipment from a radio tag attached to the baggage,
wherein the specifying unit specifies the location of the baggage based on the location of the equipment and the tag information.

Supplementary Note 4

The information processing apparatus according to supplementary note 2, further comprising:
an image matching unit that performs a matching process of a baggage image of the baggage captured by the equipment on the conveyance route with a registered baggage image of the baggage captured at the departure airport,
wherein the specifying unit specifies the location of the baggage for the baggage based on the location of the equipment and a matching result of the baggage image with the registered baggage image.

Supplementary Note 5

The information processing apparatus according to any one of supplementary notes 2 to 4,
wherein the guide unit outputs the guide information including the location of the baggage.

Supplementary Note 6

The information processing apparatus according to any one of supplementary notes 1 to 5, further comprising:
a location acquisition unit that acquires information of a location of the user in the arrival airport,
wherein the guide unit outputs the guide information including a required time for the user to move from the location of the user to the location of pickup.

Supplementary Note 7

The information processing apparatus according to supplementary note 6, wherein the guide unit outputs the required time for the available means of transportation for moving from the location of the user to the location of pickup.

Supplementary Note 8

The information processing apparatus according to supplementary note 6 or 7,
wherein the guide unit outputs the guide information including a map including a route from the location of the user to the location of pickup.

Supplementary Note 9

The information processing apparatus according to any one of supplementary notes 6 to 8,
wherein the guide unit outputs the guide information including a congestion situation at a location of a procedure that is imposed on the user when the user moves from the location of the user to the location of pickup.

Supplementary Note 10

The information processing apparatus according to any one of supplementary notes 1 to 9,
wherein the guide unit changes a display language of the guide information based on attribute information of the registrant associated with the registered biometric information.

Supplementary Note 11

The information processing apparatus according to any one of supplementary notes 1 to 10,
wherein the guide unit outputs the guide information to a display terminal installed within an area from an arrival gate of an aircraft to the location of pickup.

Supplementary Note 12

The information processing apparatus according to supplementary note 11,
wherein the guide unit outputs print data for printing the guide information on a paper medium to the display terminal.

Supplementary Note 13

The information processing apparatus according to any one of supplementary notes 1 to 11,
wherein the guide unit outputs the guide information to a terminal carried by the user.

Supplementary Note 14

The information processing apparatus according to any one of supplementary notes 1 to 13,
wherein the biometric information acquisition unit further acquires the second biometric information of the user who deposited the baggage at the departure airport,
wherein the biometric matching unit further performs a biometric matching of the second biometric information with the registered biometric information, and
the information processing apparatus further comprising a processing unit that associates the baggage with the registered biometric information when the matching result of the second biometric information with the registered biometric information is successful.

Supplementary Note 15

The information processing apparatus according to any one of supplementary notes 1 to 14,
wherein the registered biometric information is any one of a face image, a fingerprint image, and an iris image.

Supplementary Note 16

An information processing method comprising:
acquiring biometric information of a user at an arrival airport;
performing a matching process of the biometric information with registered biometric information of a registrant who deposited a baggage with the airline at a departure airport; and
outputting guide information including a location of pickup in the arrival airport and a start time of pickup of the baggage associated with the registered biometric information to the user who is authenticated as the same person as the registrant by the matching process.

Supplementary Note 17

A storage medium that stores a program for causing a computer to perform:
acquiring biometric information of a user at an arrival airport;
performing a matching process of the biometric information with registered biometric information of a registrant who deposited a baggage with the airline at a departure airport; and
outputting guide information including a location of pickup in the arrival airport and a start time of pickup of the baggage associated with the registered biometric information to the user who is authenticated as the same person as the registrant by the matching process.

REFERENCE SIGNS LIST

NW1, NW2 network
1 first airport system
2 second airport system
10 management server
11 user information DB
12 first baggage information DB
13 second baggage information DB
14 required time information DB
20 check-in terminal
30 automatic baggage check-in machine
35 baggage conveyance apparatus
40 security inspection apparatus
50 first automated gate apparatus
60 boarding gate apparatus
70 second automated gate apparatus
80 automatic customs gate apparatus
81 entrance gate terminal
82 exit gate terminal
90 signage terminal
95 operation terminal

What is claimed is:
1. An information processing apparatus comprising:
a memory configured to store instructions; and
a processor configured to execute the instructions to:

acquire biometric information of a user at an arrival airport;

perform a matching process of the biometric information with registered biometric information of a registrant who deposited a baggage with the airline at a departure airport; and output guide information including a location of a baggage claim for pickup of the baggage in the arrival airport and a start time for pickup of the baggage in the baggage claim to the user who is authenticated as the same person as the registrant by the matching process, wherein the baggage is associated with the registered biometric information of the user.

2. The information processing apparatus according to claim 1, wherein the processor is further configured to execute the instructions to:

specify a location of the baggage based on information acquired by an equipment that is installed on a conveyance route of the baggage in the arrival airport.

3. The information processing apparatus according to claim 2, wherein the processor is further configured to execute the instructions to:

acquire tag information read by the equipment from a radio tag attached to the baggage; and specify the location of the baggage based on the location of the equipment and the tag information.

4. The information processing apparatus according to claim 2, wherein the processor is further configured to execute the instructions to:

perform a matching process of a baggage image of the baggage captured by the equipment on the conveyance route with a registered baggage image of the baggage captured at the departure airport; and specify the location of the baggage for the baggage based on the location of the equipment and a matching result of the baggage image with the registered baggage image.

5. The information processing apparatus according to claim 2, wherein the processor is further configured to execute the instructions to output the guide information including the location of the baggage.

6. The information processing apparatus according to claim 1, wherein the processor is further configured to execute the instructions to;

acquire information of a location of the user in the arrival airport; and output the guide information including a required time for the user to move from the location of the user to the location of pickup.

7. The information processing apparatus according to claim 6, wherein the processor is further configured to execute the instructions to output the required time for the available means of transportation for the user to move from the location of the user to the location of pickup.

8. The information processing apparatus according to claim 6, wherein the processor is further configured to execute the instructions to output the guide information including a map including a route from the location of the user to the location of pickup.

9. The information processing apparatus according to claim 6, wherein the processor is further configured to execute the instructions to output the guide information including a congestion situation at a location of a procedure that is imposed on the user when the user moves from the location of the user to the location of pickup.

10. The information processing apparatus according to claim 1, wherein the processor is further configured to execute the instructions to change a display language of the guide information based on attribute information of the registrant associated with the registered biometric information.

11. The information processing apparatus according to claim 1, wherein the processor is further configured to execute the instructions to output the guide information to a display terminal installed within an area from an arrival gate of an aircraft to the location of pickup.

12. The information processing apparatus according to claim 11, wherein the processor is further configured to execute the instructions to output print data for printing the guide information on a paper medium to the display terminal.

13. The information processing apparatus according to claim 1, wherein the processor is further configured to execute the instructions to output the guide information to a terminal carried by the user.

14. The information processing apparatus according to claim 1, wherein the processor is further configured to execute the instructions to:

acquire the second biometric information of the user who deposited the baggage at the departure airport;

perform a biometric matching of the second biometric information with the registered biometric information; and associate the baggage with the registered biometric information when the matching result of the second biometric information with the registered biometric information is successful.

15. The information processing apparatus according to claim 1, wherein the registered biometric information is any one of a face image, a fingerprint image, and an iris image.

16. An information processing method comprising:

acquiring biometric information of a user at an arrival airport;

performing a matching process of the biometric information with registered biometric information of a registrant who deposited a baggage with the airline at a departure airport; and outputting guide information including a location of a baggage claim for pickup of the baggage in the arrival airport and a start time for pickup of the baggage in the baggage claim to the user who is authenticated as the same person as the registrant by the matching process, wherein the baggage is associated with the registered biometric information of the user.

17. A non-transitory storage medium that stores a program for causing a computer to perform:

acquiring biometric information of a user at an arrival airport;

performing a matching process of the biometric information with registered biometric information of a registrant who deposited a baggage with the airline at a departure airport; and outputting guide information including a location of a baggage claim for pickup of the baggage in the arrival airport and a start time for pickup of the baggage in the baggage claim to the user who is authenticated as the same person as the registrant by the matching process, wherein the baggage is associated with the registered biometric information of the user.

* * * * *